United States Patent
Leon

(10) Patent No.: US 11,218,446 B2
(45) Date of Patent: Jan. 4, 2022

(54) SECURE ON-PREMISE TO CLOUD COMMUNICATION

(71) Applicant: ORock Technologies, Inc., Reston, VA (US)

(72) Inventor: John Leon, Glendale, CA (US)

(73) Assignee: ORock Technologies, Inc., Reston, VA (US)

( * ) Notice: Subject to any disclaimer, the term of this patent is extended or adjusted under 35 U.S.C. 154(b) by 183 days.

(21) Appl. No.: 16/439,502

(22) Filed: Jun. 12, 2019

(65) Prior Publication Data

US 2019/0386957 A1 Dec. 19, 2019

Related U.S. Application Data

(60) Provisional application No. 62/685,772, filed on Jun. 15, 2018.

(51) Int. Cl.
*H04L 12/22* (2006.01)
*H04L 12/951* (2013.01)
(Continued)

(52) U.S. Cl.
CPC ...... *H04L 63/0245* (2013.01); *H04L 63/0876* (2013.01); *H04L 63/0272* (2013.01)

(58) Field of Classification Search
CPC ..... H04L 41/12; H04L 45/22; H04L 63/0236; H04L 45/24; H04L 47/22; H04L 45/00; H04L 45/127; H04L 45/566; H04L 45/60; H04L 29/06224; H04L 43/12; H04L 43/16; H04L 45/04; H04L 45/306;
(Continued)

(56) References Cited

U.S. PATENT DOCUMENTS 9,258,227 B2 * 2/2016 Ghosh ................ H04L 45/02
10,447,575 B1 * 10/2019 Morris ................ H04L 45/02
(Continued)

OTHER PUBLICATIONS

FPGA Implementation of IP Packet Segmentation and Reassembly in Internet Router. Carevic. Serbian Journal of Electrical Engineering. (Year: 2009).*
(Continued)

*Primary Examiner* — Venkat Perungavoor
(74) *Attorney, Agent, or Firm* — Knobbe, Martens, Olson & Bear, LLP

(57) ABSTRACT

A plurality of system nodes coupled via a dedicated private network is described herein. The nodes offer an end-to-end solution for protecting against network-based attacks. The nodes can include network gateways that allow remote systems, such as servers located at an entity's place of operation or a data center accessible by the entity, to securely transmit data between the nodes and the remote systems. For example, the network gateways can transmit split data into different portions, and transmit each portion over a different path through a public network to mitigate the effects of man-in-the-middle attacks. Once data reaches a node, transmission of the data from one node to another can pass through multiple intermediary nodes via the dedicated private network. The nodes and/or remote systems may also include cross-domain guard devices that control whether data can pass from one security domain to another.

20 Claims, 25 Drawing Sheets

(51) Int. Cl.
*H04L 29/06* (2006.01)
*H04L 12/24* (2006.01)

(58) Field of Classification Search
CPC . H04L 63/0245; H04L 63/0254; H04L 67/14; H04L 67/327; H04L 69/22
See application file for complete search history.

(56) References Cited

U.S. PATENT DOCUMENTS

| | | | | |
|---|---|---|---|---|
| 10,652,400 | B2* | 5/2020 | Westberg | H04L 67/327 |
| 2001/0003526 | A1* | 6/2001 | Kanehara | H04L 12/40058 |
| | | | | 370/465 |
| 2013/0250779 | A1* | 9/2013 | Meloche | H04L 43/06 |
| | | | | 370/248 |
| 2015/0139096 | A1* | 5/2015 | Morioka | H04W 76/12 |
| | | | | 370/329 |
| 2016/0112335 | A1* | 4/2016 | Bouanen | H04L 47/629 |
| | | | | 370/236 |
| 2017/0171154 | A1* | 6/2017 | Brown | H04L 67/02 |
| 2017/0230287 | A1* | 8/2017 | Hall | H04L 69/22 |

OTHER PUBLICATIONS

PathZip: Packet Path Tracing in Wireless Sensor Networks. Lu. IEEE. (Year: 2012).*
CN 111490934. English Translation. (Year: 2020).*
Secure Fragmentation for Content-Centric Networks. Ghali. IEEE. (Year: 2015).*
Securing MPLS Networks with Multi-path Routing. Alouneh. (Year: 2007).*
Robust Path Construction for Reliable Data Transmissions in Node Disjoint Multipath Routing for Wireless Sensor Network. Almazroi. Telkomnika. (Year: 2015).*
Conklin et al., Cisco Guide: Looking Beyond the VPN, Dispersive, White Paper, May 2018.
Dimola et al., Dispersive Virtualized Network, Dispersive, White Paper, May 2018.

* cited by examiner

SECURE ON-PREMISE TO CLOUD COMMUNICATION

CROSS-REFERENCE TO RELATED APPLICATIONS

This application claims priority under 35 U.S.C. § 119(e) to U.S. Provisional Patent Application No. 62/685,772, entitled "SECURE ON-PREMISE TO CLOUD COMMUNICATION" and filed on Jun. 15, 2018, the entire disclosure of which is hereby incorporated by reference herein.

BACKGROUND

Many electronic devices operated by users have access to or can be accessed via a network. For example, a user can use one electronic device (e.g., a computer) to access another electronic device (e.g., a set-top box) via a network. Typically, usernames and passwords are used to restrict access to network-accessible electronic devices. For example, the data associated with an electronic device may only be accessed if a user provides the correct username and password.

However, usernames and passwords offer little protection against network-based attacks. Users often select simple or common passwords that are easily deciphered by an unauthorized user. Once deciphered, the unauthorized user may have access to sensitive data and can cause physical, emotional, and/or monetary harm.

SUMMARY

One aspect of the disclosure provides a system for securely communicating data. The system comprises a computing system comprising one or more computing devices, the computing system configured to operate as a cross-domain guard, the computing system located in a data center that has an internal network with a first security domain, the computing system configured with computer-executable instructions that, when executed, cause the computing system to: determine that a first data packet can be transmitted from the first security domain to a second security domain based on an analysis of content of the first data packet; and prevent transmission of a second data packet from the first security domain to the second security domain based on an analysis of content of the second data packet. The system further comprises a source network gateway in communication with the computing system and located in the data center, the source network gateway comprising a hardware processor, the source network gateway configured with second computer-executable instructions that, when executed, cause the source network gateway to obtain and split the first data packet into a third data packet and a fourth data packet that is not a duplicate of the third data packet. The system further comprises a remote system located at a location remote from the data center, the remote system having a second internal network with the second security domain, the remote system further comprising a remote network gateway, where the remote network gateway is configured with third computer-executable instructions that, when executed, cause the remote network gateway to: obtain the third data packet from the source network gateway via a first path through the network; obtain the fourth data packet from the source network gateway via a second path through the network; and assemble the third data packet and the fourth data packet to form a reassembled version of the first data packet.

The system of the preceding paragraph can include any sub-combination of the following features: where the system further comprises a redundant remote system in communication with the remote system via a private network, the redundant remote system configured to obtain the reassembled version of the first data packet from the remote system via the private network; where the system further comprises a second remote system in communication with the remote system via a private network, where the second remote system has a third internal network with the second security domain, the second remote system further comprising a second remote network gateway and a processing server, where the second remote network gateway is configured with fourth computer-executable instructions that, when executed, cause the second remote network gateway to: obtain a fifth data packet from the remote network gateway via a third path through the private network, the fifth data packet created based on a split of the reassembled version of the first data packet, obtain a sixth data packet from the remote network gateway via a fourth path through the private network, the sixth data packet created based on the split of the reassembled version of the first data packet, assemble the fifth data packet and the sixth data packet to form a second reassembled version of the first data packet, and transmit the second reassembled version of the first data packet to the processing server; where the fourth computer-executable instructions, when executed, further cause the second remote network gateway to: obtain a processed data packet from the processing server, split the processed data packet into a seventh data packet and an eighth data packet, transmit the seventh data packet to the remote network gateway via a fifth path through the private network, and transmit the eighth data packet to the remote network gateway via a sixth path through the private network such that the remote network gateway can assemble the seventh and eighth data packets into a ninth data packet and forward contents of the ninth data packet to the source network gateway; where the third path passes through a network gateway of a third remote system in communication with the remote system and the second remote system via the private network, and where the fourth path passes through a network gateway of a fourth remote system in communication with the remote system and the second remote system via the private network; where the remote system comprises a processing server, and where the processing server receives the reassembled version of the first data packet from the remote network gateway; where the source network gateway comprises an access point, a controller, and a processing unit; where the access point is configured to authenticate a user device using at least one of heuristics or a media access control (MAC) address of the user device; where the processing unit comprises at least one graphical processing unit (GPU), and where the processing unit is configured to process the content included in the first data packet using the at least one GPU; where the processing unit is configured to run remote applications locally in the data center such that a user device can access the remote applications via the access point without communicating data over a public network; and where the processing unit is coupled to a switch in the data center, where the controller is coupled to the processing unit and the access point, and where the controller serves as an interface to a public network.

Another aspect of the disclosure provides a computer-implemented method for securely communicating data. The computer-implemented method comprises: determining that a first data packet present in a first security domain in a data center can be transmitted from the first security domain to a second security domain based on an analysis of content of the first data packet; preventing transmission of a second data packet from the first security domain to the second security domain based on an analysis of content of the second data packet; splitting the first data packet into a third data packet and a fourth data packet that is not a duplicate of the third data packet; transmitting the third data packet via a source network gateway and a first path through a network to a second network gateway remote from the data center; and transmitting the fourth data packet via the source network gateway and a second path through the network to the second network gateway, where the second network gateway is configured to assembly the third data packet and the fourth data packet to form a reassembled version of the first data packet.

The computer-implemented method of the preceding paragraph can include any sub-combination of the following features: where a redundant network gateway is in communication with the second network gateway via a private network, the redundant network gateway configured to obtain the reassembled version of the first data packet from the second network gateway via the private network; where the computer-implemented method further comprises, by a third network gateway in communication with the second network gateway via a private network: obtaining a fifth data packet from the second network gateway via a third path through the private network, the fifth data packet created based on a split of the reassembled version of the first data packet, obtaining a sixth data packet from the second network gateway via a fourth path through the private network, the sixth data packet created based on the split of the reassembled version of the first data packet, assembling the fifth data packet and the sixth data packet to form a second reassembled version of the first data packet, and transmitting the second reassembled version of the first data packet to a processing server; where the computer-implemented method further comprises, by the third network gateway: obtaining a processed data packet from the processing server, splitting the processed data packet into a seventh data packet and an eighth data packet, transmitting the seventh data packet to the second network gateway via a fifth path through the private network, and transmitting the eighth data packet to the second network gateway via a sixth path through the private network such that the second network gateway can assemble the seventh and eighth data packets into a ninth data packet and forward contents of the ninth data packet to the source network gateway; where the third path passes through a fourth network gateway in communication with the second and third network gateways via the private network, and where the fourth path passes through a fifth network gateway in communication with the second and third network gateways via the private network; where the source network gateway comprises an access point, a controller, and a processing unit; where the processing unit comprises at least one graphical processing unit (GPU), and where the processing unit is configured to process the content included in the first data packet using the at least one GPU; and where the processing unit is configured to run remote applications locally in the data center such that a user device can access the remote applications via the access point without communicating data over a public network.

Another aspect of the disclosure provides non-transitory, computer-readable storage media comprising computer-executable instructions, where the computer-executable instructions, when executed by a computing system in a data center, cause the computing system to: determine that a first data packet present in a first security domain can be transmitted from the first security domain to a second security domain based on an analysis of content of the first data packet; prevent transmission of a second data packet from the first security domain to the second security domain based on an analysis of content of the second data packet; split the first data packet into a third data packet and a fourth data packet that is not a duplicate of the third data packet; transmit the third data packet via a source network gateway and a first path through a network to a second network gateway remote from the data center; and transmit the fourth data packet via the source network gateway and a second path through the network to the second network gateway, where the second network gateway is configured to assembly the third data packet and the fourth data packet to form a reassembled version of the first data packet.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Introduction

As discussed above, usernames and passwords provide little protection against network-based attacks. Conventional data network systems offer solutions to secure electronic devices and/or the channel by which electronic devices communicate over a network from unwanted intrusions, but such solutions leave gaps that can be exploited by unauthorized users. Thus, a system that offers end-to-end protection against network-based attacks may be desirable. This may be especially true given the proliferation of network-accessible data storage systems, where valuable information is stored and accessed via a network, and/or network-accessible electronic devices.

Accordingly, a multi-node environment is described herein in which a plurality of nodes coupled via a dedicated private network offer an end-to-end solution for protecting against network-based attacks. For example, a single node can receive and store user data via a data flow that passes through various components of the node. The node can be designed such that communications internal to the node, such as the transmission of encryption keys, are partitioned or walled off from the components of the node that handle the publicly accessible data flow. The node also includes a key management subsystem to facilitate the use of encryption keys to encrypt user data.

Multi-Node Architecture Overview

Figure 1:
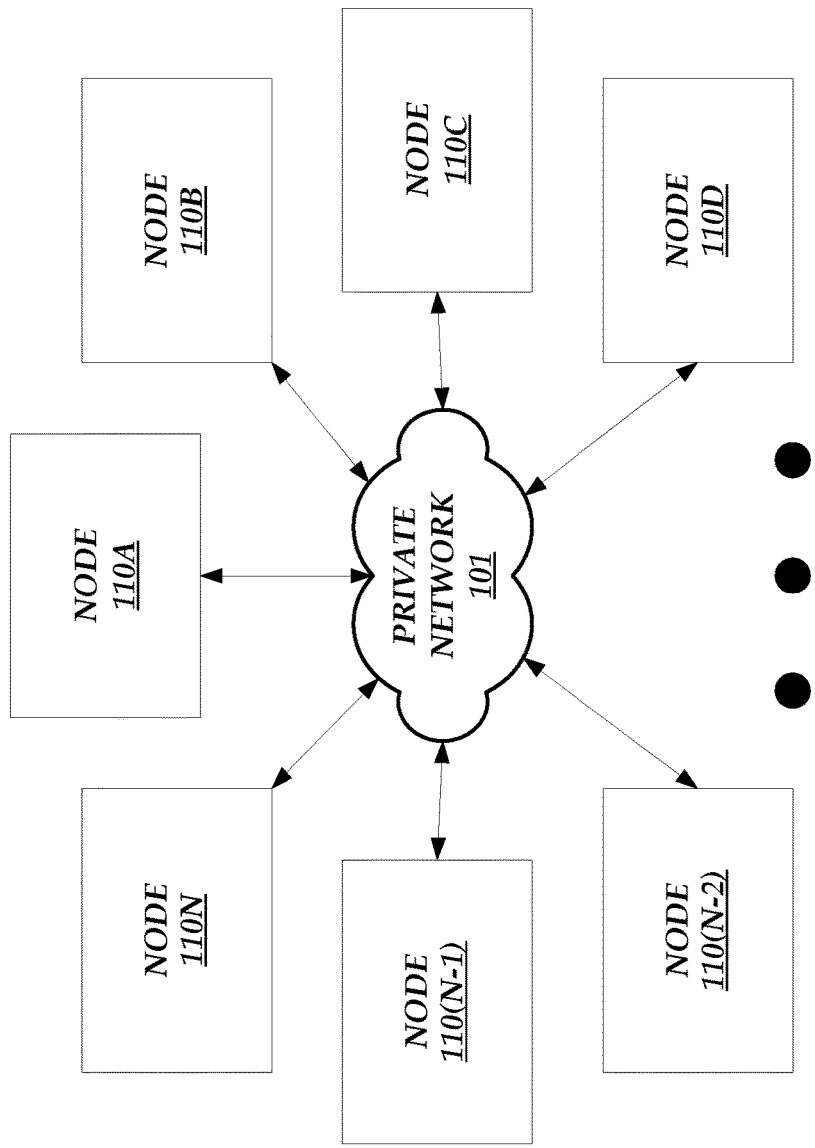
FIG. 1 illustrates a multi-node environment.

FIG. 1 illustrates a multi-node environment. As shown in FIG. 1, the multi-node environment includes a plurality of nodes 110A-N that communicate with each other via a dedicated private network 101. Each node 110A-N can be a system that includes a variety of electronic devices and/or components, as described in greater detail below with respect to FIGS. 2A-6. The nodes 110A-N can be configured to control user devices, detect inconsistencies in the operation of one or more user devices, store user data, and/or protect stored user data from network-based attacks.

The private network 101 can be a privately accessible network of linked networks, possibly operated by various distinct parties, such as a personal area network, local area network, wide area network, cable network, satellite network, cellular telephone network, etc. or combination thereof, each with access to and/or from the Internet. The private network 101 can provide superior network performance through dedicated bandwidth and low latency as compared to other publicly available networks, such as the Internet. For example, the private network 101 can provide a direct connection between the various nodes 110A-N in the multi-node environment, where the communication channel providing the direct connection cannot be accessed by electronic devices that are configured to access a publicly available network. Because access to the private network 101 is restricted to just the nodes 110A-N, the risk of a network-based intrusion of the nodes 110A-N or the data transmitted between the nodes 110A-N is greatly diminished.

In some embodiments, as discussed below, the nodes 110A-N also have access to publicly accessible networks, such as the Internet. Each node 110A-N can include an access server and/or router that enforces a separation between the publicly accessible network and the private network 101.

Each node 110A-N can be located in a different geographic location. For example, the node 110A can be located in a first country (e.g., the United States of America), the node 110B can be located in a second country (e.g., the United Kingdom), and so on. Alternatively, each node 110A-N may reside at a common geographic location.

In an embodiment, each node 110A-N is identical in composition and operation. The nodes 110A-N can operate in real-time to replicate data between or among the various nodes 110A-N to ensure that the sum of aggregate data is present in both or all node 110A-N locations. This redundancy not only improves the reliability of the multi-node environment, but also enhances the threat-detecting capability of the nodes 110A-N. For example, the nodes 110A-N may independently identify Internet Protocol (IP) addresses from which one or more attacks on the respective node 110A-N (e.g., to disable or impair the functionality of the respective node 110A-N) or attempted intrusions into the respective node 110A-N have originated. A node, such as the node 110A, may transmit a routing table that includes the IP addresses that the node 110A has identified as a threat to one or more of the other nodes 110B-N so that the other nodes 110B-N can update their routing tables accordingly. Thus, by sharing routing tables between nodes 110A-N, an address identified as a threat at one node can be blocked by the other nodes in the environment.

The similarity in architecture between various nodes 110A-N may enable any node 110A-N to serve as the secondary storage and/or processing site for any other node 110A-N. Thus, a multi-node environment that includes identically constructed nodes 110A-N may have a built-in secondary storage site to permit the storage and/or recovery of information. In other words, the nodes 110A-N may be redundant. The actual pairing of primary and secondary storage sites may be determined by taking into account a variety of factors, such as regional legal requirements, latency, and/or the like. The secondary storage site can have information security safeguards equivalent to or nearly equivalent to those of the primary site and can maintain connectivity to the primary site. Such a multi-node environment may also include an inherent secondary processing site to permit the resumption of system operations when primary processing capabilities become unavailable. The secondary processing site can have information security safeguards equivalent to or nearly equivalent to those of the primary site. The redundancy of the nodes 110A-N is described in greater detail below with respect to FIGS. 2A-B and 6.

In other embodiments, the nodes 110A-N are not identical in composition and/or operation. For example, the nodes 110A-N may include additional components required by the jurisdiction in which the respective node 110A-N resides to comply with one or more security standards (or may not include components that cannot be included in the respective node 110A-N in order to comply with one or more security standards).

Node Composition

Figure 2A:
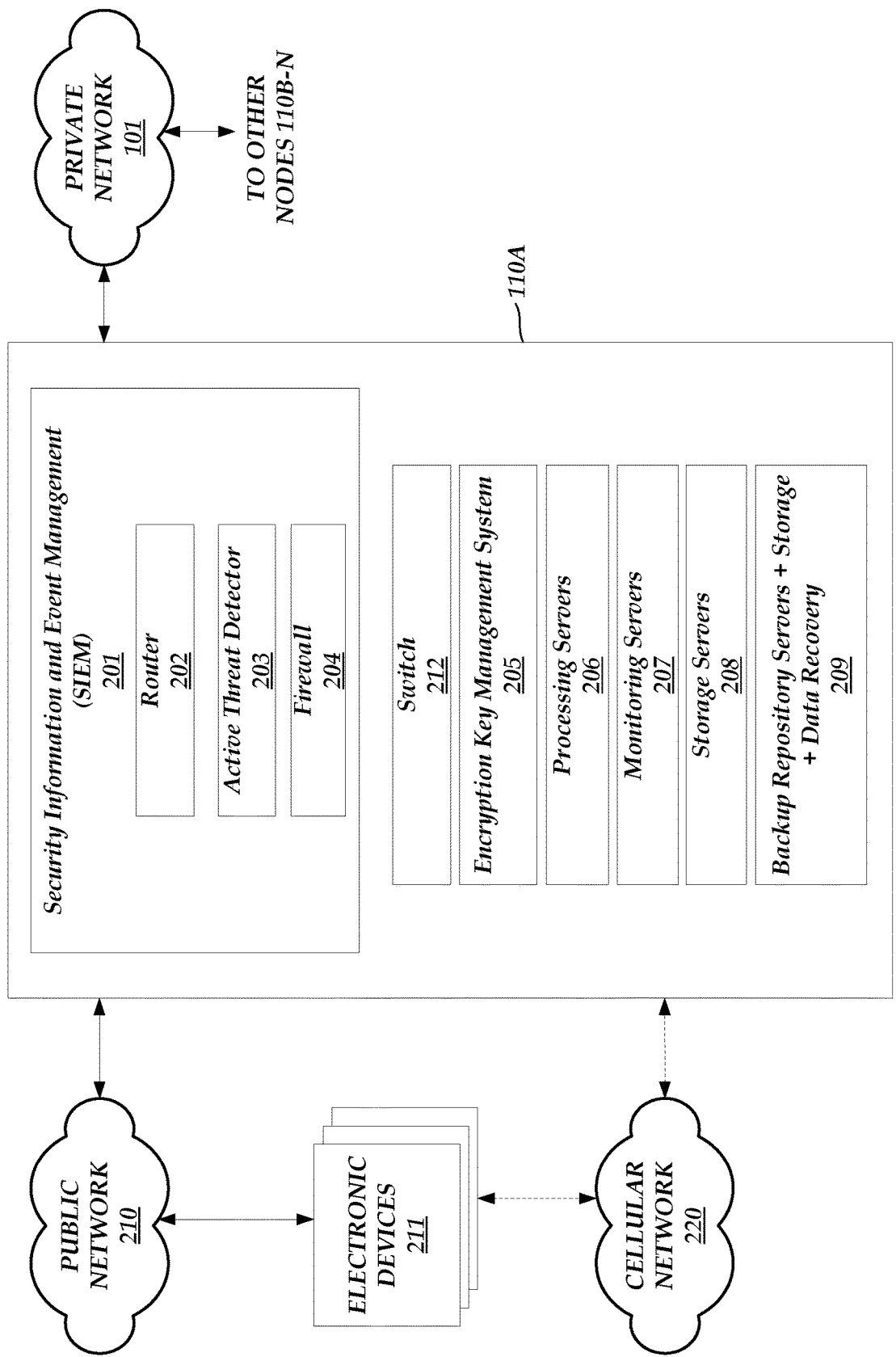
FIG. 2A-2B illustrate the components of an exemplary node in the multi-node environment of FIG. 1.
Figure 2B:
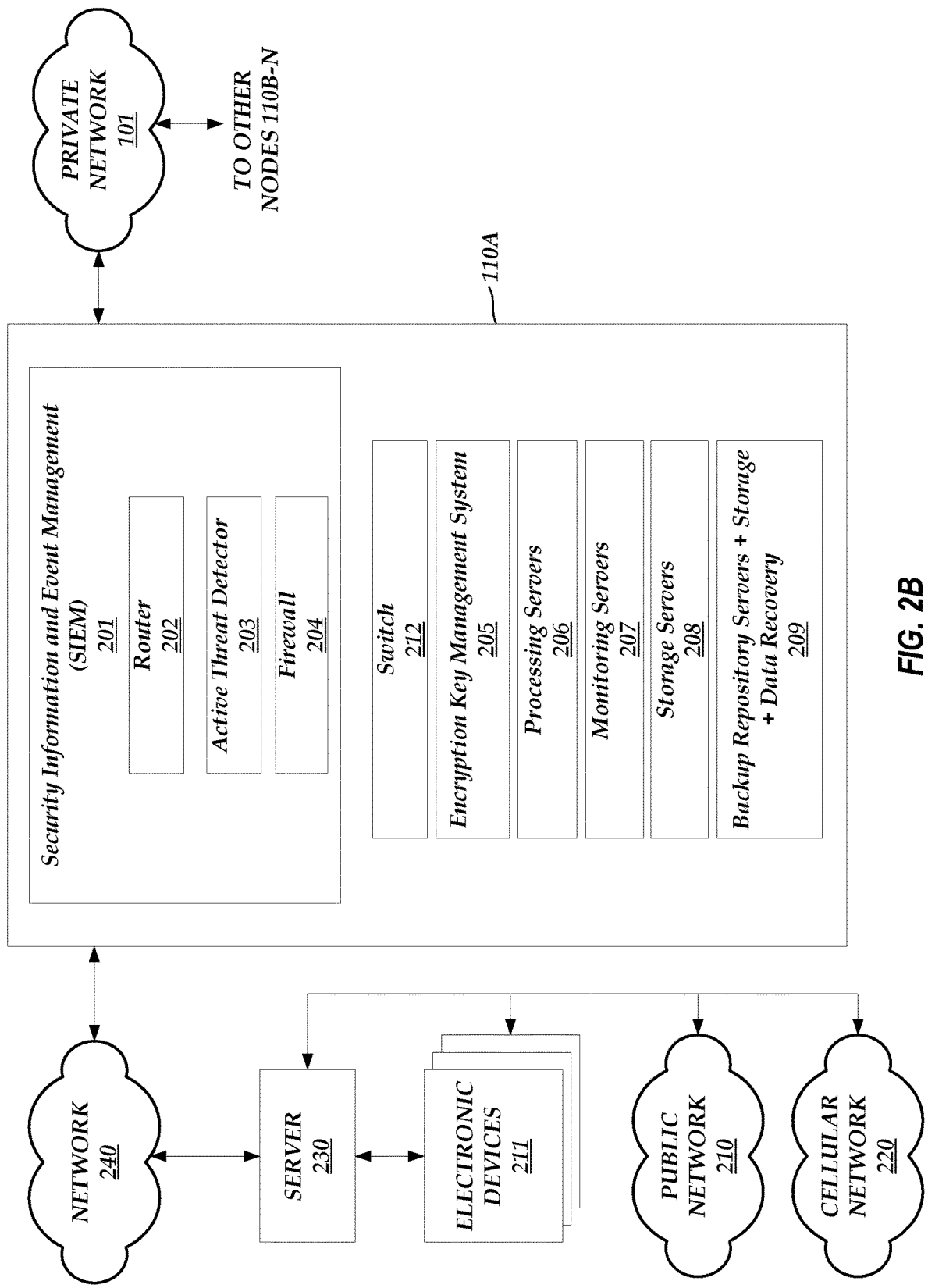

FIGS. 2A-2B illustrate the components of an exemplary node 110A in the multi-node environment of FIG. 1. Any of a variety of alternate node architectures may alternatively be used for some or all of the nodes 110A-N. Alternatively or in addition, the architecture of the node 110A can be similar to the architecture of the nodes 110B-N and/or the operations performed by the node 110A can also be performed by the nodes 110B-N. As shown in FIGS. 2A-B, the node 110A can include a security information and event management (SIEM) system 201, a switch 212 (e.g., a CISCO CATALYST 3650 Series switch, a CISCO CATALYST 4500 Series switch, etc.), an encryption key management system 205 (e.g., two HP Enterprise Secure Key Managers), one or more processing servers 206 (e.g., ten HP DL380 servers), one or more monitoring servers 207 (e.g., two HP DL380 servers), one or more storage servers 208 (e.g., an HP 3PAR STORESERV system), and one or more backup repository servers 209 (e.g., an HP 3PAR STORESERV system). The SIEM system 201 can include a router 202 (e.g., a CISCO ASR Boundary Device), an active threat detector 203 (e.g., a RAYTHEON SUREVIEW Threat Detector), and a firewall 204 (e.g., a FORTINET firewall, a PALO ALTO NETWORKS 5000 Series firewall, etc.). Some or all of the components of the node 110A can reside at a common geographic location and may be interconnected on a local area network.

The SIEM system 201 may provide boundary security. Within the SIEM system 201, individual intrusion detection tools can be integrated into a system-wide intrusion detection sub-system. The router 202 can interface with the external world and transfer data between the node 110A and the external world. For example, the router 202 can transfer data between the node 110A and other nodes 110B-110N via the private network 101. As illustrated in FIG. 2A, the router 202 can also transfer data between the node 110A and electronic devices 211 via a public network 210 (e.g., a publicly accessible network of linked networks, such as the Internet) and/or a cellular network 220 (e.g., a private network operated by a cellular carrier or operator). Alternatively or in addition, as illustrated in FIG. 2B, the router 202 can transfer data between the node 110A and a server 230 via a network 240 (e.g., a public and/or private network similar to the public network 210, the cellular network 220, and/or the private network 101). The server 230 can be a computing system that manages one or more of the electronic devices 211 and that communicates with the electronic devices 211 via the public network 210 and/or the cellular network 220. Alternatively or in addition, the server 230 can communicate with the electronic devices 211 via a private network, such as a local area network (not shown). The node 110A can communicate with electronic devices 211 via the server 230. Here, because the node 110A communicates with the server 230 via the network 240 (which can be a private network) and the communication channel is encrypted and secure due to the security techniques implemented by the node 110A, any unauthorized users would not detect and cannot interfere with instructions transmitted by the node 110A to the server 230. In the situation that the network 240 is a private network, unauthorized users would not even have the ability to access the network 240. Thus, the node 110A can communicate securely with the server 230 without the unauthorized user having the ability to reject, prevent, and/or manipulate the communication.

The active threat detector 203 can monitor network activities and/or detect abnormal events and/or abnormal patterns of activities. The active threat detector 203 may receive third party threat data from external sources (e.g., via the public network 210) to enhance the monitoring and detection functionality. For example, the active threat detector 203 may periodically receive updated lists or ranges of Internet Protocol (IP) addresses that have been identified as suspicious or from which malicious activity has originated (e.g., by malware analysis software). The lists may be in the form of a routing table (e.g., an internal address resolution protocol (ARP) routing table) that the active threat detector 203 can use to compare with the source and/or destination address of incoming packets. The active threat detector 203 can be automatically updated each time the third party threat data is received from external sources. Alternatively, the active threat detector 203 can be updated once the received third party threat data is approved for use by an administrator. In an embodiment, the nodes 110A-N can share such received third party threat data via the private network 101. Thus, if access to the external sources is severed for one node 110A-N, that node 110A-N can receive the third party threat data from another node 110A-N instead.

The firewall 204 can control network activities and/or work in tandem with real-time threat detection performed by the active threat detector 203. Like with the active threat detector 203, the firewall 204 can also receive third party threat data from external sources (e.g., via the public network 210) to enhance the control of network activities. The third party threat data may be received from the same external sources as the active threat detector 203 or from different external sources. The third party threat data may be in the form of routing tables and/or lists or ranges of suspicious or malicious IP addresses and may be used in the same manner as the active threat detector 203 as described above. The third party threat data can also be shared between the nodes 110A-N via the private network 101. The threat detection activities of the active threat detector 203 and/or the firewall 204 are described in greater detail below with respect to FIG. 8.

In an embodiment, the STEM system 201 components 202-204 correlate information to provide a more robust security scheme. For example, the SIEM system 201 uses information generated by the router 202, the active threat detector 203, and/or the firewall 204 to protect data from unauthorized access, modification, and/or deletion. If one of the active threat detector 203 or the firewall 204 identifies malicious activity that originates from an IP address that otherwise was not identified in the data received from the external sources, the active threat detector 203 and/or the firewall 204 flags the IP address as a malicious address. The active threat detector 203 and/or the firewall 204 may then notify the other nodes 110A-N (via the router 202) of this newly identified IP address so that the other nodes 110A-N can be prepared to block and/or analyze a packet that originates from or is destined for the newly identified IP address. In this way, if one node 110A identifies a threat, the other nodes 110B-N can be automatically updated to recognize and prepare for the same threat.

Thus, the STEM system 201 can support both external threat detection (e.g., using third party threat data) and internal threat detection (e.g., threats identified by a node 110A-N). Both the third party threat data and the threat data identified by a single node 110A-N can be shared with the other nodes 110A-N via the private network 101 (e.g., as routing tables or updates to routing tables) such that the routers 202, the active threat detectors 203, and/or the firewalls 204 of each of the nodes 110A-N are configured with the same, updated threat information.

The SIEM system 201 can support a dedicated connection within the multi-node environment to maintain a separate network within the multi-node environment (e.g., as represented by the private network 101). The separate network (e.g., the private network 101) can be dedicated to a single user or entity to implement the particular technical requirements desired by the user or entity. In an embodiment, the SIEM system 201 uses Border Gateway Protocol (BGP) to switch and/or route traffic across the private network 101, the public network 210, and/or other private or public networks not shown (e.g., dedicated network connections, such as tunneled connections, to an enterprise network).

The one or more processing servers 206 can execute applications, virtual machines, and/or the like that are requested by users attempting to access the node 110A. The one or more processing servers 206 can also perform analytics on user data. For example, the one or more processing servers 206 can track historical data, scheduling data, and/or the like and provide statistical information derived from such data. The one or more processing servers 206 can derive this information in real-time (e.g., as the data is received and processed by the node 110A) or on-demand (e.g., when requested by a user) to allow a user to review events that have already occurred. Alternatively, another server (not shown) within the node 110A can track historical data, scheduling data, and/or the like and provide statistical information derived from such data.

The one or more monitoring servers 207 can be configured to monitor the one or more processing servers 206 to ensure that the applications executed by the one or more processing servers 206 are running properly. The one or more monitoring servers 207 can start, restart, stop, and/or pause any applications executed by the one or more processing servers 206 for diagnostic purposes. The one or more monitoring servers 207 may also control and monitor the power, cooling, and/or other environmental elements of the node 110A. The one or more monitoring servers 207 may also perform authentication monitoring to ensure that users are only provided access to the node 110A after being successfully authenticated (e.g., the one or more monitoring servers 207 can include or act as a lightweight directory access protocol (LDAP) server).

The one or more storage servers 208 can include one or more self-encrypting drives (SEDs) that are each non-transitory storage mediums (e.g., magnetic disk drives, solid state memory drives, etc.) configured to encrypt and store received data using encryption keys provided by another component (e.g., the encryption key management system 205 in this case).

In some embodiments, the one or more backup repository servers 209 are configured to store data backups and to perform disaster recovery (e.g., data recovery) operations. In other embodiments, the one or more backup repository servers 209 are only configured to store data backups. The one or more backup repository servers 209 can store backups of data associated with the SIEM system 201, the switch 212, the encryption key management system 205, the one or more processing servers 206, the one or more monitoring servers 207, and/or the one or more storage servers 208.

In an embodiment, the one or more backup repository servers 209 of one node, such as node 110A, stores data backups of data associated with another node, such as node 110B Likewise, the one or more backup repository servers 209 of the node 110B stores data backups of data associated with the node 110A. Thus, the data backup stored in one node is a mirror of the data of another node (and allows the node with the stored data backup to act as a redundant node). A circuit, such as a virtual circuit (not shown) can monitor the status of each of the nodes 110A-N. If a first node becomes inactive, the circuit notifies a second node that stores the data backup of the inactive first node and the second node temporarily operates as the first node (and the second node). Thus, if the node 110A becomes inactive, the one or more backup repository servers 209 of the node 110B operate as the node 110A, providing the functionality that the node 110A normally would provide.

While the backup node operates as the inactive node, the backup node may store data, change settings, and/or make other changes that have not been introduced in the inactive node. Before the inactive node becomes fully active and starts operating as normal, the backup node and the inactive node may be synched. For example, once the inactive node becomes active again, the circuit notifies the backup node, the backup node updates the inactive node to include any changes that occurred since the inactive node became inactive, and the inactive node begins operating under normal conditions again. Thus, if the node 110A becomes active again, the one or more backup repository servers 209 of the node 110B updates any or all components of the node 110A such that the node 110A and the data in the one or more backup repository servers 209 associated with the node 110A are synched, and the node 110A then begins normal operations (and the one or more backup repository servers 209 of the node 110B cease operating as the node 110A and merely provide backup services as before).

In alternate embodiments, the one or more backup repository servers 209 of a node store data backups of data associated with that same node. If the node becomes inactive, the one or more backup repository servers 209 of the node may operate as described above to provide services until the node becomes active again.

In an embodiment, a node, such as the node 110A, includes components to separate user functionality (including user interface services) from system management functionality. For example, a multi-node environment may utilize sub-networks for publicly accessible system components and logically separate those components from system-internal networks and/or functions. A node can also include components to prevent unauthorized and/or unintended information from being transferred through shared multi-node environment resources. A node can include components to partition stored information into various components residing in separate physical domains or environments. In some embodiments, in addition to the physical separation of stored information, the multi-node environment maintains a separate execution domain for each executing process running in the nodes 110A-N of the multi-node environment.

Each node 110A-N may be a single computing device or may include multiple distinct computing devices, such as computer servers, logically or physically grouped together to collectively operate as a system. The components of each node 110A-N can each be implemented in application-specific hardware (e.g., a server computing device with one or more ASICs) such that no software is necessary, or as a combination of hardware and software. In addition, the modules and components of each node 110A-N can be combined on one server computing device or separated individually or into groups on several server computing devices. In some embodiments, each node 110A-N may include additional or fewer components than illustrated in FIGS. 2A-2B.

In some embodiments, the features and services provided by each node 110A-N may be implemented as web services consumable via the public network 210 and/or the cellular network 220. In further embodiments, each node 110A-N is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Each electronic or user device 211 can be an Internet of Things (IoT) device. As used herein, an IoT device can be any electronic device that can collect and/or exchange data via a network and/or that can be sensed or controlled remotely via a network. For example, an IoT device can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, home automation devices (e.g., "smart thermostats" or "smart meters"), sensors (e.g., sensors that measure physical data like voltage, current, pressure, temperature, soil acidity, heart rate, blood pressure, etc.), transportation vehicles (e.g., automobiles, train cars, airplanes, helicopters, bicycles, motorcycles, ships, etc.), robots, digital signs, automated teller machines, set-top boxes, gaming consoles, entertainment systems, televisions with network access and program execution capabilities (e.g., "smart TVs"), and various other electronic devices and appliances. Individual IoT devices may execute a browser application to communicate via the public network 210 and/or the cellular network 220 with other computing systems, such as the node 110A or the other nodes 110B-110N, in order to transmit and/or receive data (e.g., settings or device parameter information) and/or in order to be sensed or controlled remotely. Alternatively, an electronic device 211 can be a device other than an IoT device (e.g., a device that does not collect or exchange data and/or that is not sensed or controlled remotely via a network, such as a non-network-enabled device).

As described herein, a user can access one or more nodes 110A-N via a user device (e.g., a computing device, like an electronic device 211 or a non-IoT device, that is or is not being monitored by the nodes 110A-N). For example, the nodes 110A-N may be located so that they are close (in either a geographical or networking sense) to groups of user devices. In such a configuration, a user device may be provided access to the node 110A-N to which it is closest and/or to the node 110A-N that shares a geographic region with the user device, rather than all user devices being provided access to a single node 110A-N. If the node 110A-N to which a user device is closest and/or to that shares a geographic region with the user device is offline (e.g., due to an outage, maintenance, etc.), then the user device may be provided access to the next closest node 110A-N, the node 110A-N assigned to be a backup of the offline node, and/or the like.

Figure 3A:
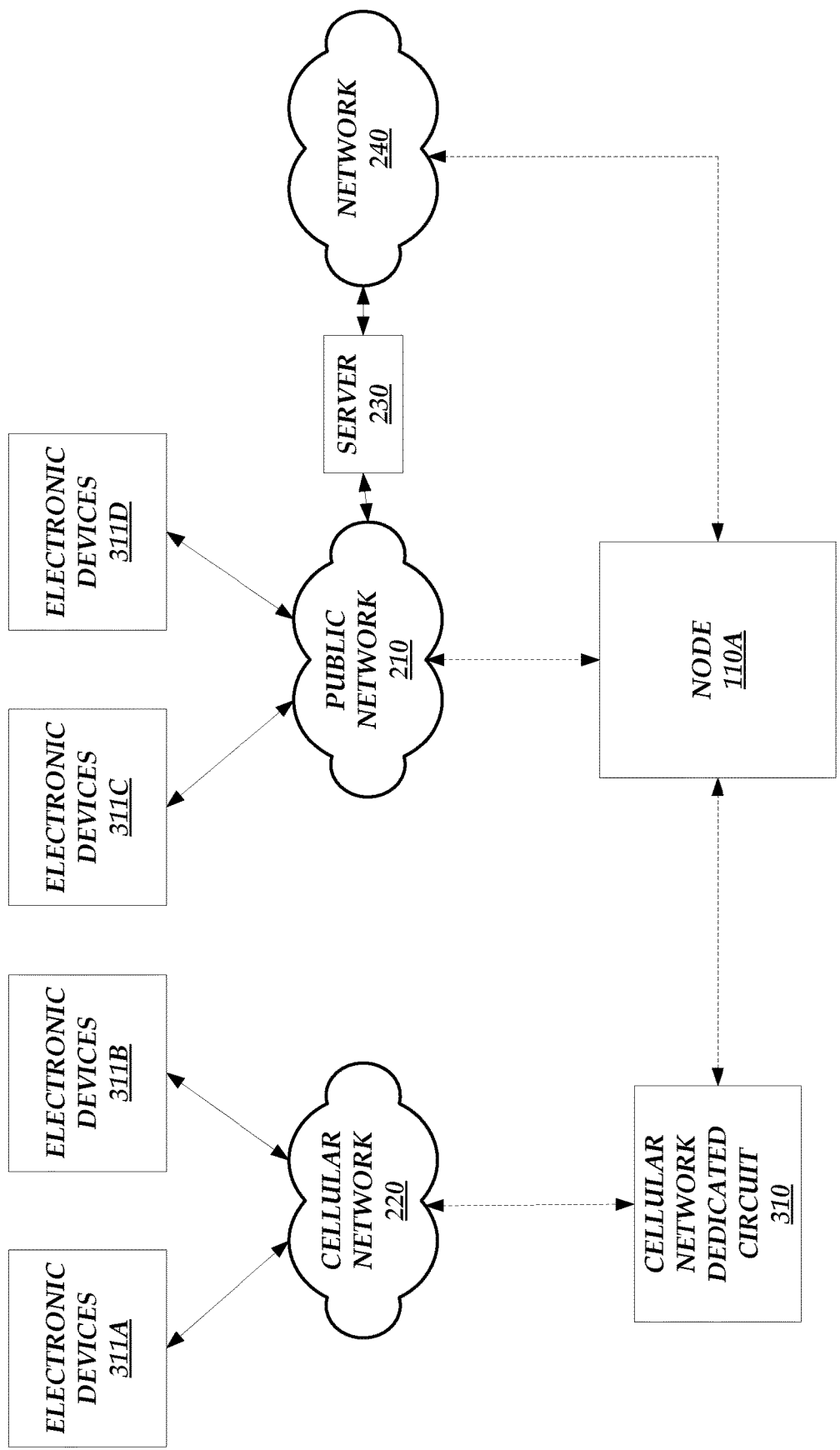
FIG. 3A illustrates an example data flow between electronic devices and a node of FIG. 1.

FIG. 3A illustrates an example data flow between IoT devices, such as electronic devices 311, and the node 110A. While FIG. 3A illustrates three different ways that the node 110A can communicate with various electronic devices 311, this is not meant to be limiting. The node 110A can communicate with electronic devices 311 using any combination of the different ways illustrated in FIG. 3A. For example, the node 110A can communicate with electronic devices 311A-B via a cellular network dedicated circuit 310 and the cellular network 220. The cellular network dedicated circuit 310 may provide an interface between the node 110A and the internal networking components of the cellular network 220. This example is described in greater detail below with respect to FIG. 3B. As another example, the node 110A can communicate with electronic devices 311C-D via the public network 210. This example is described in greater detail below with respect to FIG. 3C. As another example, the node 110A can communicate with the electronic devices 311C-D via the network 240 and the server 230.

Figure 3B:
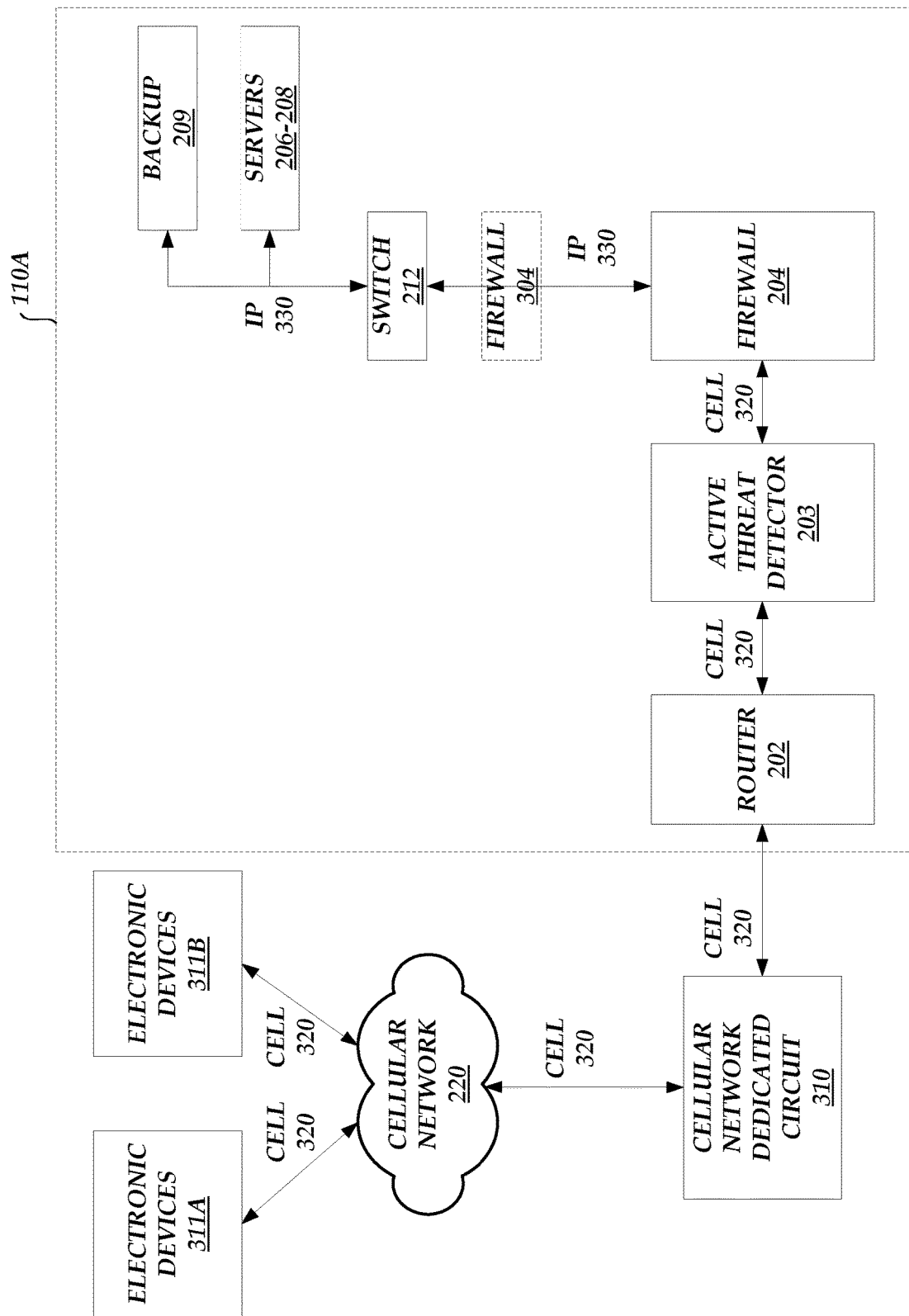
FIG. 3B illustrates an example data flow between electronic devices and the components in a node of FIG. 1 via a cellular network.

FIG. 3B illustrates an example data flow between IoT devices, such as the electronic devices 311A-B, and the components in node 110A via the cellular network 220. As illustrated in FIG. 3B, the router 202 can receive communications from and transmit communications to the cellular network dedicated circuit 310. The communications may be encapsulated according to a cellular carrier protocol 320. In an embodiment, the electronic devices 311A-B are capable of communicating via the cellular network 220. Thus, the data transmitted between the electronic devices 311A-B and the router 202 are encapsulated according to the cellular carrier protocol 320. In addition, the router 202 may route such data to the active threat detector 203 and the active threat detector 203 may route such data (e.g., after filtering none, some, or all of the data) to the firewall 204. The data transmitted between these components 202-204 may still be encapsulated according to the cellular carrier protocol 320.

In an embodiment, the firewall 204 converts the data from the cellular carrier protocol 320 to an Internet protocol (IP) 330 or another similar network-based protocol. The data may pass through another firewall 304 before reaching the switch 212. The switch 212 then routes the data encapsulated according to the IP 330 to one of the servers 206-208 or the one or more backup repository servers 209.

Likewise, data from the one or more backup repository servers 209 or one of the servers 206-208 can be transmitted to the switch 212 and can be encapsulated according to the IP 330. The switch 212 can forward the data to the firewall 204. The firewall 204 can then convert the data from the IP 330 to the cellular carrier protocol 320 and the re-encapsulated data can then be forwarded to the active threat detector 203, the router 202, and the cellular network dedicated circuit 310 before reaching the cellular network 220 and eventually one of the electronic devices 311A or 311B.

Figure 3C:
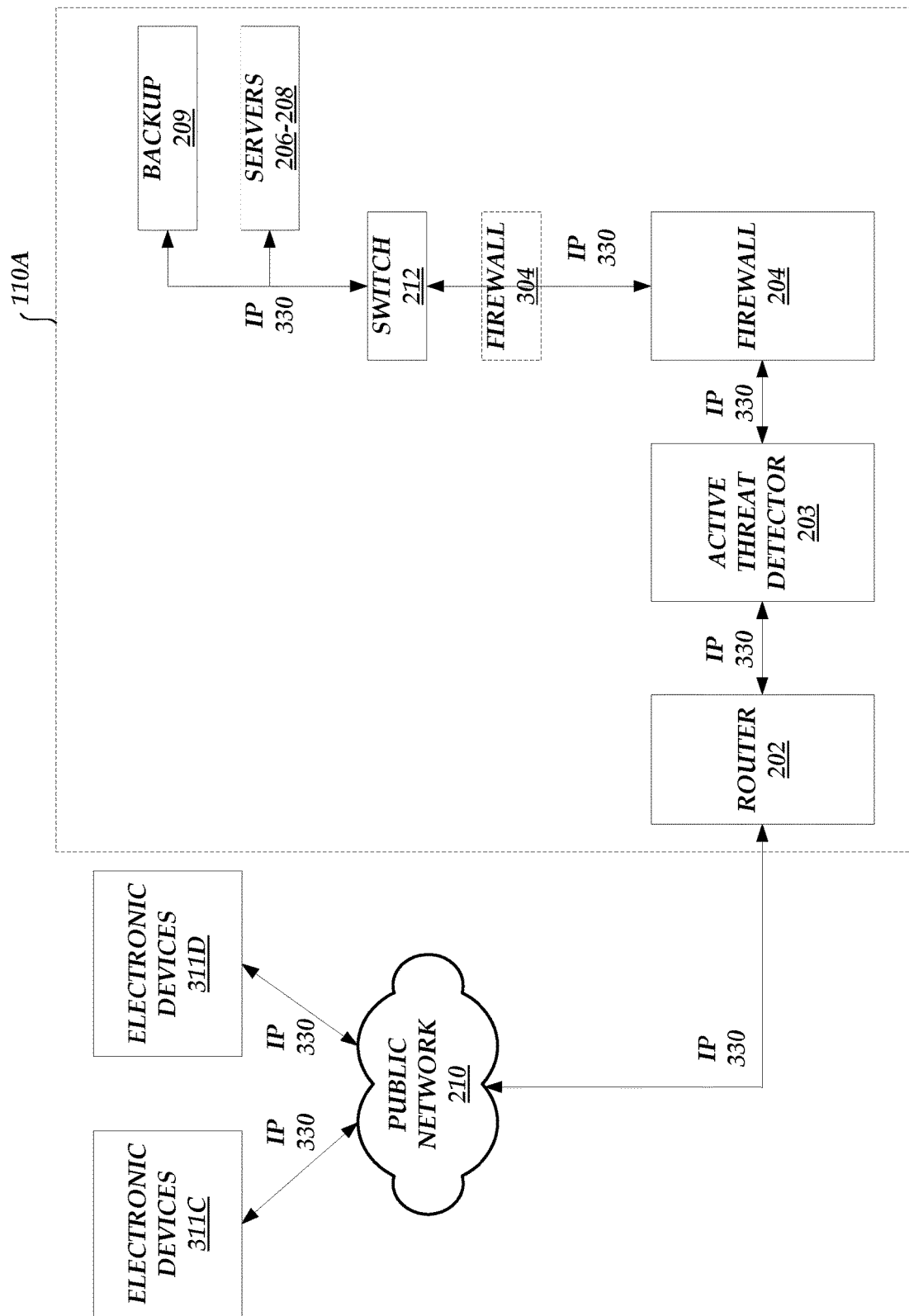
FIG. 3C illustrates an example data flow between electronic devices and the components in a node of FIG. 1 via a public network.

FIG. 3C illustrates an example data flow between IoT devices, such as the electronic devices 311C-D, and the components in the node 110A via the public network 210. Unlike the example illustrated in FIG. 3B, all data transmitted between the electronic devices 311C-D and one of the servers 206-208 or the one or more backup repository servers 209 are encapsulated according to the IP 330. While FIGS. 3B and 3C are illustrated as separate examples, this is not meant to be limiting. The node 110A can handle data encapsulated according to the IP 330 received from and transmitted to the public network 210, data encapsulated according to the cellular carrier protocol 320 received from and transmitted to the cellular network dedicated circuit 310, and/or data encapsulated according to any proprietary protocol received from and transmitted to the network 240.

End-to-End Protection

As described above, conventional data network systems may have gaps in their security schemes. Some conventional data network systems may allow data to be transmitted in an unsecured manner over a public network, such as the Internet, leaving open the possibility that the data can be captured, snooped, or otherwise accessed by an unauthorized user. Some conventional data network systems may store or transmit encryption keys together with encrypted data, allowing the encrypted data to be easily compromised. The multi-node environment described herein seeks to close such security gaps.

For example, a node, such as one of the nodes 110A-N, implements security protocols at an interface between the private network 101 and the public network 210 and the internal components of the respective node 110A-N (e.g., the SIEM system 201) to guard against external cyberattacks. Security solutions at the network interface work in tandem with system-internal controls to enforce information flow through secure connections and configurations. As an example, Secure Socket Layer (SSL) encryption can be used to secure data that is transmitted between electronic devices 211 and the node 110A via the public network 210. The node 110A can perform SSL decryption within a secure boundary (e.g., the SIEM system 201) in which the decrypted and/or clear-text data only exists for a finite duration of time. The node 110A can re-encrypt the decrypted data using encryption keys securely generated by the encryption key management system 205. The node 110A can employ a robust encryption algorithm, such as AES-256, to encrypt the data as the data is stored onto a storage drive, such as a storage drive included in the storage servers 208. In an alternative embodiment, a tunnel encryption, such as a Virtual Private Network (VPN) encryption, protects data transmission between electronic devices 211 and the node 110A. Communications that are entirely within the node 110A can also be encrypted.

In an embodiment, the SIEM system 201 is configured to perform threat detection, real-time response, automatic event logging, and/or post-event analysis. For example, the node 110A (e.g., the STEM system 201) can detect some or all unauthorized access attempts and enforce appropriate security responses (e.g., disabling access after multiple access failures within a predetermined period of time). The node 110A (e.g., the SIEM system 201) can perform automatic logging of some or all security-related system events, including successful and/or unsuccessful account login events, account management events, object access, policy change, privilege functions, process tracking, and/or system events. The node 110A (e.g., the STEM system 201) can also perform automatic logging of some or all security-related web-application events, including some or all administrator activity, authentication checks, authorization checks, data deletions, data access, data changes, permission changes, remote connections to the node 110A, and/or some or all unauthorized access attempts. An event monitor and analyzer within the node 110A (e.g., within the STEM system 201) can perform post-event analysis and permit comprehensive security auditing and process management.

The operations performed by the SIEM system 201 at the network interface of the node 110A include monitoring and controlling communications sent and received via the various networks 101 and 210. Such operations performed by the STEM system 201 may work in tandem with internal security techniques implemented by other components of the node 110A that monitor and control communications at key internal boundaries within the node 110A. The STEM system 201 may implement a wireless intrusion detection system to identify rogue wireless devices and to detect attack attempts and potential compromises/breaches to the information system.

The node 110A can enforce encryption on some or all remote access connections, whether initiated by a user or a system administrator. Some or all data can be encrypted. Further, in some embodiments, the node 110A configures some or all secure connections to use managed entry points that employ boundary protection devices (e.g., SIEMs).

In an embodiment, the node 110A (e.g., the one or more monitoring servers 207) employs a multi-factor authentication scheme to prevent unauthorized access. For example, the multi-factor authentication can include a username and password, a secure code separately transmitted to a first user device associated with a user that is attempting to access the node 110A via a second user device, biometrics (e.g., a fingerprint, a vein map, a behavioral signature, such as physiological characteristics of a user that describe a way the user interacts with an input device (e.g., a keyboard, touch pad, mouse, etc.), etc.), and/or the like. Through authentication, the node 110A can uniquely identify and authenticate users and/or user processes with unique identifiers and enforce specific strength requirements on the identifiers. The node 110A can also require users to be authorized with the node 110A before assigning accounts. In an embodiment, the node 110A may, in an emergency or extraordinary situation, temporarily permit an individual to be authenticated with an authenticator with a reduced number of factors compared with normal operation. In some embodiments, multi-factor login verification data is encrypted for confidentiality.

Figure 4:
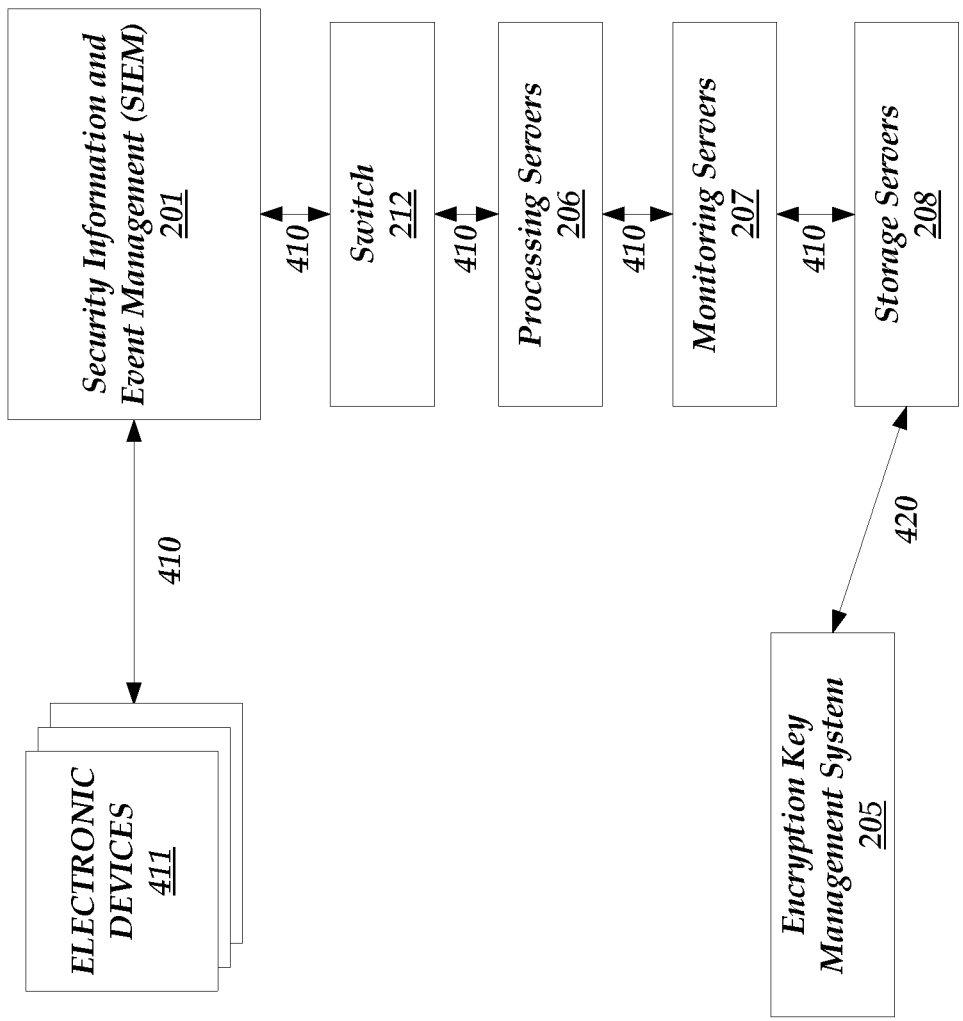
FIG. 4 illustrates an example data flow between an electronic device and the components in a node of FIG. 1.

As described herein, the node 110A can be designed such that communications internal to the node 110A are partitioned or walled off from publically accessible node 110A components. A multi-tier architecture of the node 110A (e.g., the components within the STEM system 201) can segment contact between application-specific information (e.g., user data) and other system information (e.g., encryption keys). For example, FIG. 4 illustrates an example data flow between an electronic device 211 and the components in the node 110A. As illustrated in FIG. 4, a first data path 410 includes communications between the electronic device 211 and the STEM system 201, between the SIEM system 201 and the switch 212, between the switch 212 and the one or more processing servers 206, between the one or more processing servers 206 and the one or more monitoring servers 207, and between the one or more monitoring servers 207 and the one or more storage servers 208. A second data path 420 includes communications (e.g., the transmission of encryption keys) between the encryption key management system 205 and the one or more storage servers 208. The first data path 410 and the second data path 420 do not overlap and/or do not share communication interfaces such that the information transmitted over one data path cannot be accessed by components in the other data path.

Encryption Key Management (EKM) System

Figure 5:
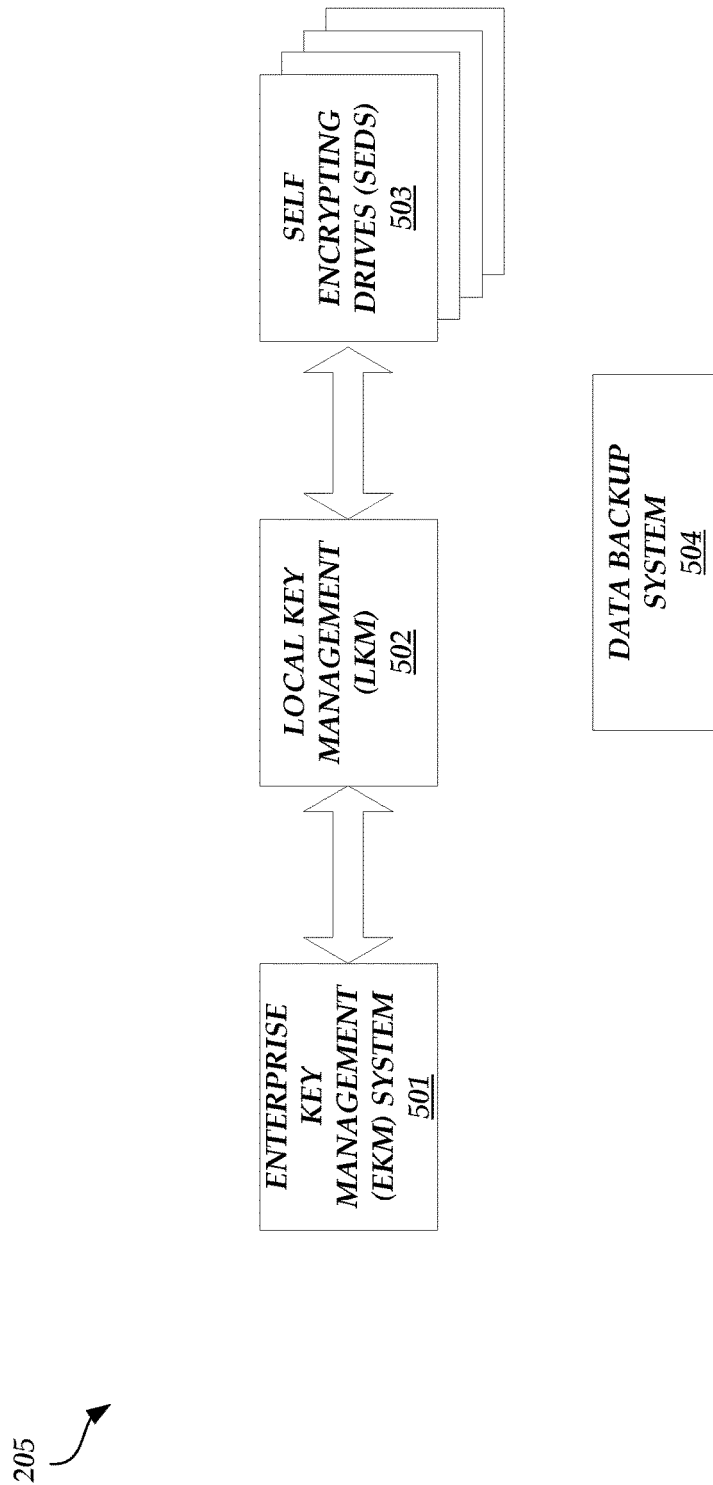
FIG. 5 illustrates a detailed block diagram of the encryption key management system of a node of FIG. 1.

FIG. 5 illustrates a detailed block diagram of the encryption key management system 205 of the node 110A. The encryption key management system 205 includes a key management subsystem to facilitate the use of encryption keys to encrypt user data. For example, as illustrated in FIG. 5, the encryption key management system 205 includes an enterprise key management (EKM) system 501, a local key management (LKM) system 502, and one or more self encrypting drives (SEDs) 503. While FIG. 5 illustrates a single LKM system 502, this is not meant to be limiting. The EKM system 501 may be associated with a plurality of LKM systems 502, and each LKM system 502 may be associated with a separate set of SEDs 503.

In an embodiment, the multi-node environment employs cryptographic security controls to protect the confidentiality and integrity of transmitted information through the deployment of hardware and software solutions. The multi-node environment can enforce cryptographic protection throughout the environment except where the information is otherwise protected within the private network 101. For example, the information may otherwise be protected when a node 110A-N decrypts data encrypted using an SSL channel encryption scheme and re-encrypts the data using a storage drive encryption scheme or decrypts data using a storage drive encryption scheme and re-encrypts the data using an SSL channel encryption scheme.

The encryption of data files within a node 110A-N can be performed in a variety of ways. One approach, for example, may follow standards outlined in NIST FIPS 140-2 documentation where all encryption keys are stored in a depository separate from a location where the encrypted files are stored, backed up, and/or accessed. The EKM system 501 can be configured to serve as the depository that generates and stores all encryption keys. The EKM system 501 can enforce encryption using the encryption keys through native hardware control. The EKM system 501 may then communicate with other hardware components that use encryption keys. The LKM System 502 can manage requests from and transfers of encryption keys to multiple storage drives (e.g., SEDs 503). For example, the LKM system 502 can store information that indicates which encryption keys are being used and/or have been used by a given SED 503, how often an encryption key has been used to encrypt data, encryption key rotation information, and/or the like. The SEDs 503 can be configured to automatically encrypt data using provided encryption keys and store such encrypted data. The SEDs 503 can use embedded hardware to enforce in-line encryption and/or decryption. In some embodiments, clear-text data cannot be extracted from SEDs 503. The use of in-line hardware can minimize the delay associated with encryption and/or decryption operations. The smaller delay, together with key generation and/or management functions included within the encryption key management system 205, can render the encryption process transparent to users (e.g., the user is unaware of the encryption keys used to encrypt user data). This transparency may increase user-friendliness and data security because critical encryption keys never leave the secure domain of the node 110A.

As an example, the EKM system 501 may generate one or more encryption keys. A SED 503 can request an encryption key to be used for encrypting data received from an electronic device 211 associated with a user via the public network 210. The request from the SED 503 can be received by the LKM system 502. The LKM system 502 can then request a new encryption key from the EKM system 501. The EKM system 501 can transmit the encryption key to the LKM system 502 and the LKM system 502 can forward the encryption key to the SED 503. The LKM system 502 can store information indicating that the specific encryption key was sent to the specific SED 503. The LKM system 502 can use this information along with an encryption key rotation policy to anticipate when a new encryption key may be needed for a SED 503. Once the requested encryption key is received by the SED 503, the SED 503 can encrypt and/or decrypt data received from the electronic device 211. The SED 503 may encrypt data as data is received from the electronic device 211. Alternatively, the SED 503 may encrypt data at regular intervals or at a set time.

The data backup system 504 can be configured to back up data stored in the SEDs 503. The data backup system 504 can store backup data on the SED 503 associated with the backup (and the stored backup data can be encrypted by the SED 503 using the same encryption key as used to encrypt the other data stored on the SED 503). For example, the data backup system 504 can receive, from the LKM system 502, the encryption key currently being used by the SED 503 to encrypt and decrypt data. The data backup system 504 can use the encryption key to decrypt the encrypted data already stored on the SED 503. The data backup system 504 can then extract encrypted backup data from the decrypted data of the entire SED 503 and decrypt the backup data using a key previously used by the data backup system 504 to encrypt the backup data. The data backup system 504 can then perform a data backup of the SED 503 (e.g., a data backup of the encrypted data or a data backup of the decrypted data, where the data backup system 504 decrypts the encrypted data using the received encryption key) and replace the old decrypted backup data with new backup data. The data backup system 504 can receive another encryption key from the LKM system 502 or another LKM system local to the data backup system 504 and use this encryption key to encrypt the new data backup before storing the new, encrypted data backup on the SED 503. The new, encrypted data backup on the SED 503 may be stored with a different encryption flag to identify the data as being encrypted with a different key than the key used to encrypt the other data stored on the SED 503. The data on the SED 503, including (or not including) the new, encrypted data backup, may then be encrypted using a new key provided by the LKM system 502.

If the user requests a data restore, the data backup system 504 can use the encryption key to decrypt the encrypted data already stored on the SED 503. The data backup system 504 can then extract encrypted backup data from the decrypted data of the entire SED 503 and decrypt the backup data using a key previously used by the data backup system 504 to encrypt the backup data. The data backup system 504 can then initiate a restore of the decrypted backup data. The backup data can be restored to the SED 503 and/or transmitted to the user. Once the restore is complete, the data backup system 504 can re-encrypt the decrypted backup data and store the encrypted backup data on the SED 503 (and re-encrypt all of the data stored on the SED 503 as described above).

Thus, in some embodiments, the data backup is encrypted by the data backup system 504 using a first encryption key and then the encrypted data backup (along with the other data stored on the SED 503) is encrypted again by the SED 503 using a second encryption key. The data backup system 504 can be a standalone component in the encryption key management system 205 or the functionality described above for the data backup system 504 can be performed by the one or more backup repository servers 209.

In an embodiment, the encryption key management system 205 produces, controls, and/or distributes symmetric encryption keys using NIST FIPS-compliant key management technology and processes. The encryption key management system 205 can also produce, control, and/or distribute asymmetric encryption keys using NSA-approved key management technology and processes. The encryption key management system 205 may obtain public key certificates under an appropriate certificate policy from an approved service provider.

In an embodiment, the multi-node environment employs cryptographic security controls to protect the confidentiality and integrity of data through the deployment of hardware and software solutions throughout the environment. The cryptographic security controls protect data, whether at rest or in transit.

Encryption Key Management System Redundancy

Figure 6:
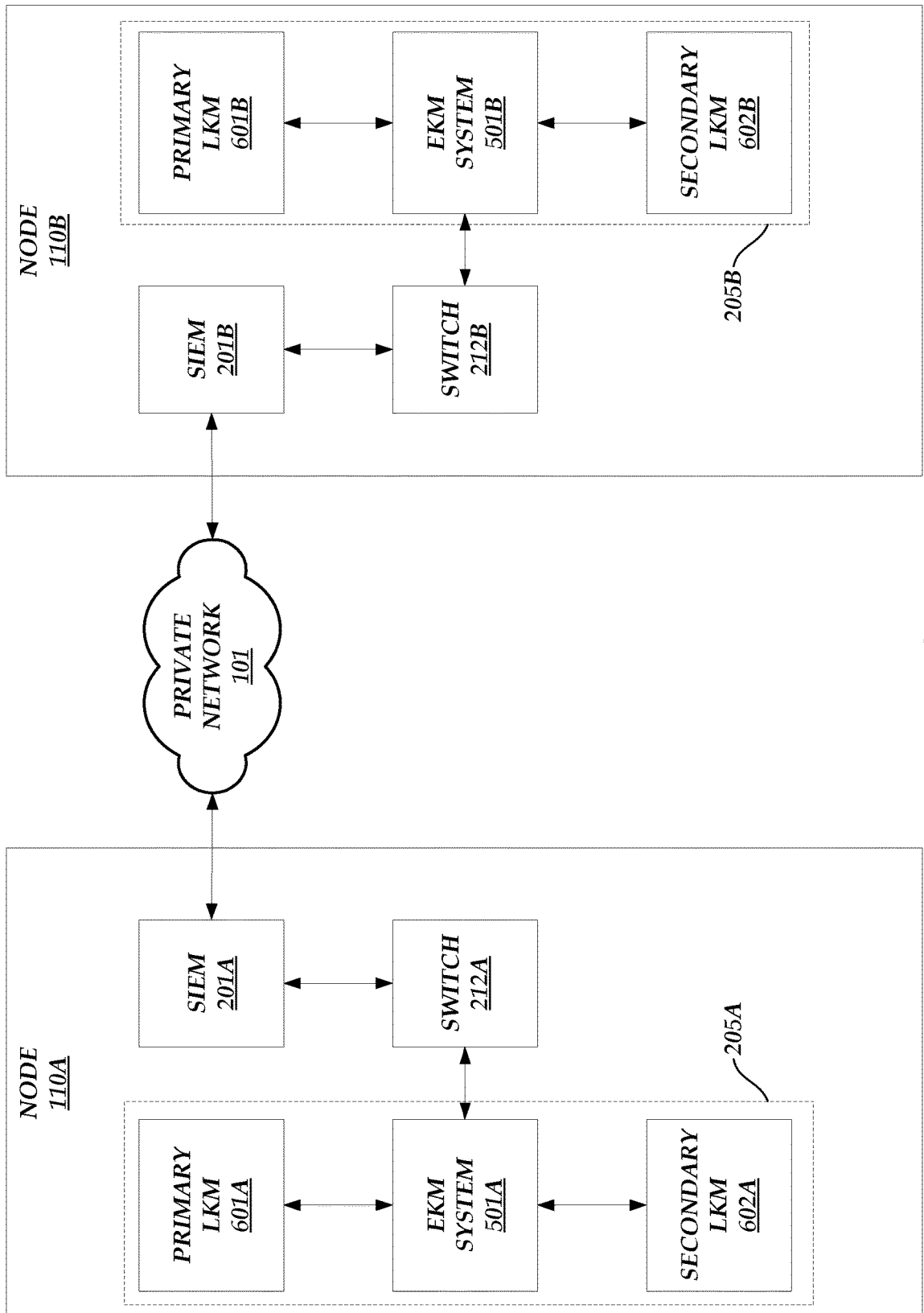
FIG. 6 illustrates the redundancy of the encryption key management systems of FIGS. 2A-2B between the nodes of FIG. 1.

FIG. 6 illustrates the redundancy of the encryption key management systems 205A-B between nodes 110A-B. FIG. 6 illustrates the interaction between the encryption key management systems 205A-B of nodes 110A-B, respectively, but the techniques disclosed herein can apply to any pair or set of nodes 110A-N. As illustrated in FIG. 6, the node 110A includes an encryption key management system 205A that includes an EKM system 501A, a primary LKM 601A, and a secondary LKM 602A. Similarly, the node 110B includes an encryption key management system 205B that includes an EKM system 501B, a primary LKM 601B, and a secondary LKM 602B.

In an embodiment, the primary LKMs 601A-B are active in normal operation and the secondary LKMs 602A-B are used for disaster recovery. The EKM system 501A can communicate with the EKM system 501B (and any other EKM system of any other node 110C-N) via the switch 212A, the SIEM system 201A, the private network 101, the SIEM system 201B, and the switch 212B. The EKM systems 501A-B can communicate, for example, so that both EKM systems 501A-B include the encryption keys generated by the other EKM system 501A-B (and/or the other EKM systems in the multi-node environment) so that an encryption key management system of one node can operate in place of another encryption key management system of another node when that encryption key management system in the other node is down or inactive.

For example, the secondary LKM 602A may be a backup copy of the primary LKM 601B. Similarly, the secondary LKM 602B may be a backup copy of the primary LKM 601A. The primary LKMs 601A-B may periodically be backed up so that the secondary LKMs 602A-B have current data. The EKM system 501A and/or the primary LKM 601A (via the EKM system 501A) of the node 110A can monitor the primary LKM 601B of the node 110B by periodically polling the primary LKM 601B (e.g., and determining that the LKM 601B is active if a response to the poll is received). If the primary LKM 601B becomes unavailable or inactive (as determined by the polling of the primary LKM 601B), the primary LKM 601A and/or the EKM system 501A activates the secondary LKM 602A, which then functions as the primary LKM of the node 110B. The secondary LKM 602A can operate as the primary LKM of the node 110B because of the exchange of encryption keys between the EKM systems 501A-B and/or because of the periodic backups of the primary LKM 601B (which are stored in the secondary LKM 602A).

If the primary LKM 601B becomes active again (as determined by the polling of the primary LKM 601B), the secondary LKM 602A synchs with the primary LKM 601B so that the primary LKM 601B has the most up-to-date information. The secondary LKM 602A then ceases to function as the primary LKM of the node 110B and the primary LKM 601B resumes normal operation as described herein.

Example Process for Providing an Encryption Key to an SED

Figure 7:
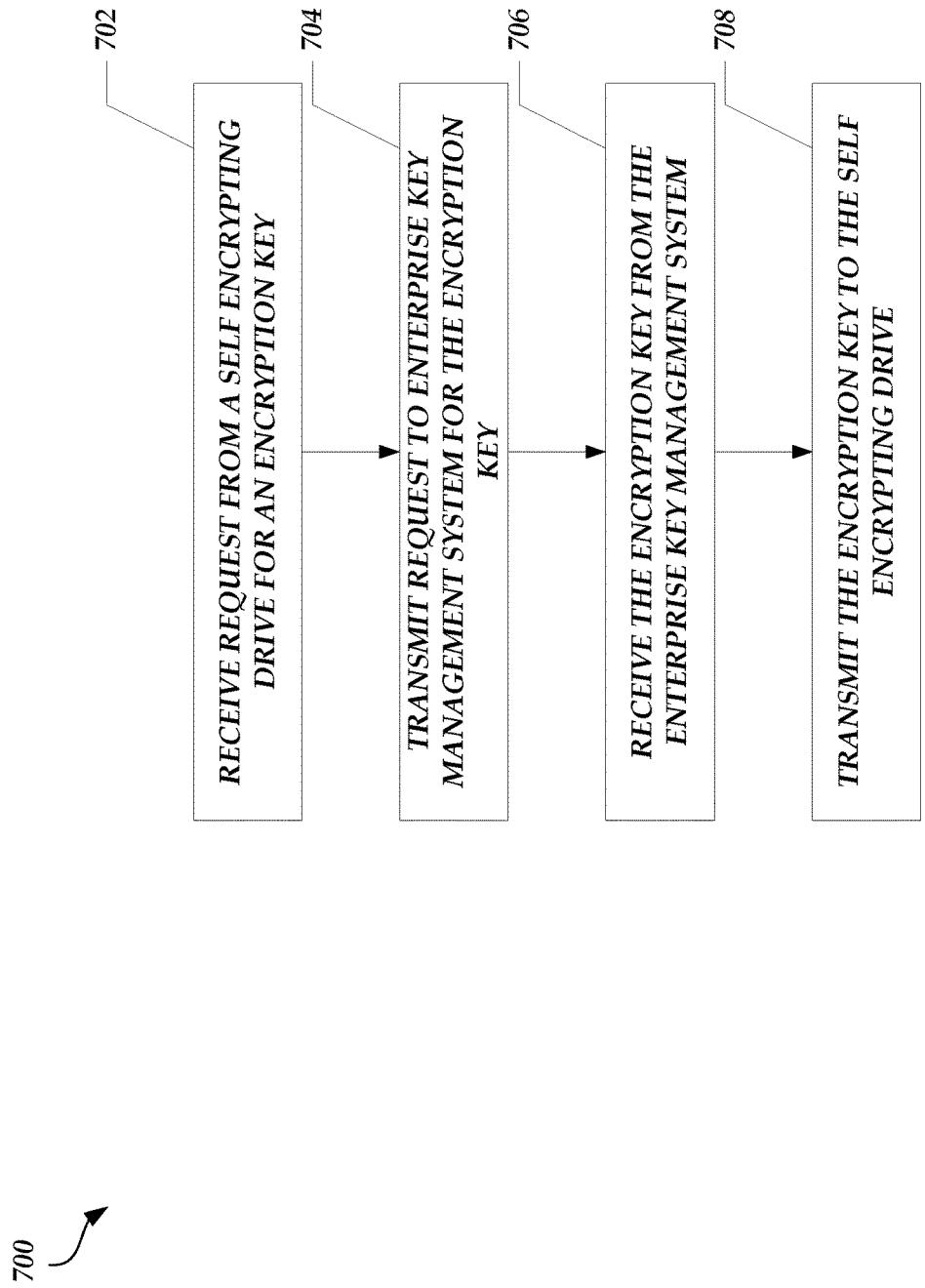
FIG. 7 illustrates a process that may be implemented by a local key management (LKM) system of FIG. 5 to provide an encryption key to an self-encrypting drive (SED), such as the SED of FIG. 5.

FIG. 7 illustrates a process 700 that may be implemented by the LKM system 502 to provide an encryption key to an SED, such as the SED 503. The process 700 begins at block 702.

At block 702, a request for an encryption key is received from a self-encrypting drive. The self encrypting drive may request the encryption key to encrypt data received from an IoT device, such as the electronic device 211 (e.g., settings or device parameter information).

At block 704, a request for the encryption key is transmitted to the enterprise key management system. The request may be transmitted to the enterprise key management system in response to receiving the request from the self encrypting drive.

At block 706, the encryption key is received from the enterprise key management system. In an embodiment, the LKM system 502 stores information associating the received encryption key with the self encrypting drive that requested the encryption key. Such information can include an encryption key identifier, a rotation policy associated with the encryption key, and/or the like.

At block 708, the encryption key is transmitted to the self encrypting drive. The self encrypting drive may use the encryption key to encrypt and/or decrypt data stored in the self encrypting drive.

Example Data Packet Analysis

Figure 8:
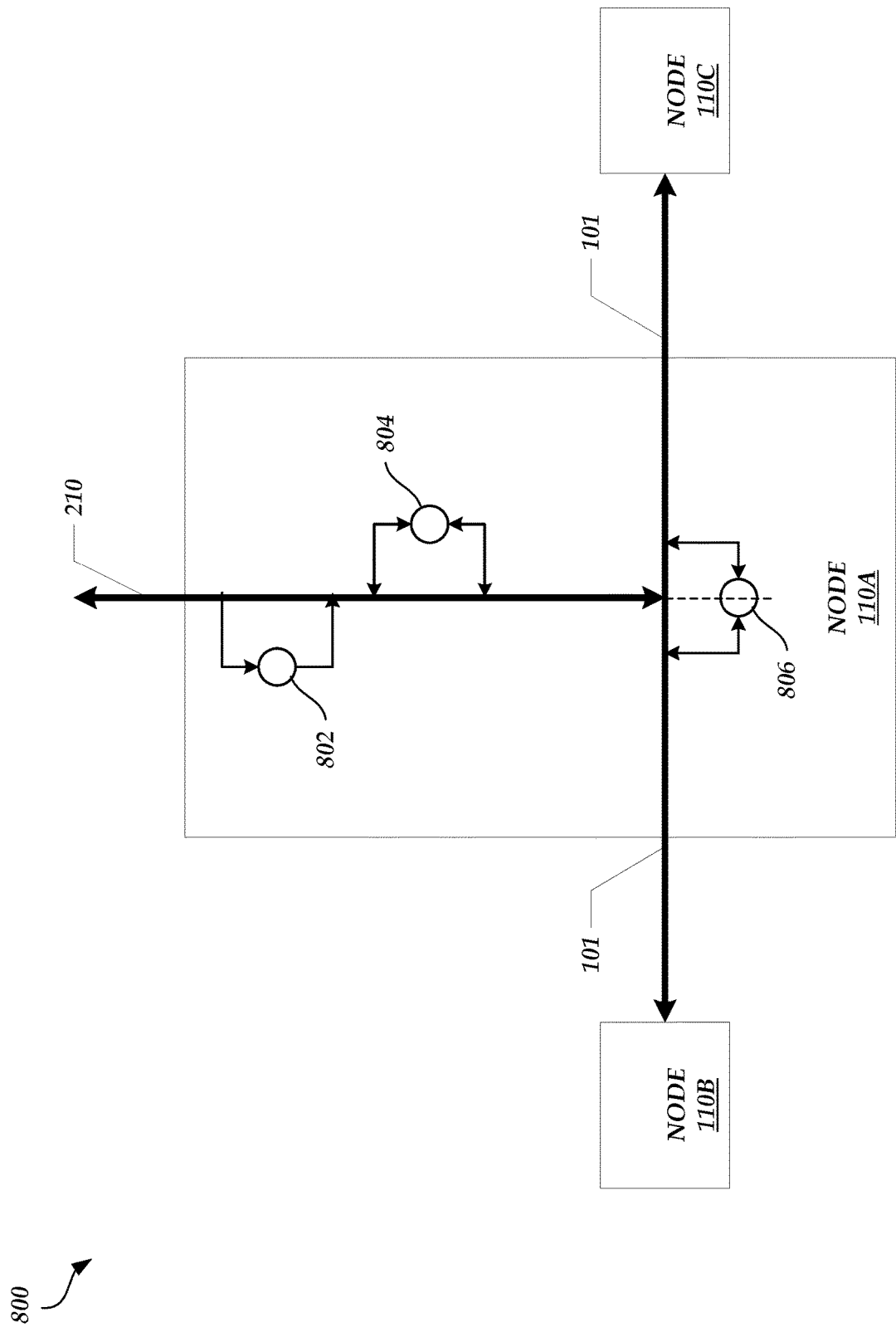
FIG. 8 illustrates an example data packet analysis through a security information and event management (SIEM) system within a node.

FIG. 8 illustrates an example data packet inspection flow 800 that may be implemented in any node, such as node 110A. As illustrated in FIG. 8 and described herein, the node 110A can receive and transmit data packets via the private network 101 and/or via the public network 210. The node 110A may analyze these data packets for threat detection purposes. For example, the SIEM system 201 (e.g., the active threat detector 203 and/or the firewall 204) of the node 110A performs the data packet analysis.

In some embodiments, the node 110A performs a different type of data packet analysis based on the source and/or destination of the respective data packet. For example, if a data packet originates from another node (e.g., node 110B, node 110C, etc.) and is transmitted over the private network 101, then the SIEM system 201 performs a first type of analysis, conceptually represented at location 806. If a data packet originates from an external device (e.g., one of electronic devices 211) and is transmitted over the public network 210 or cellular network 220 (not shown), then the SIEM system 201 performs a second type of analysis, conceptually represented at location 802, and/or a third type of analysis, conceptually represented at location 804. Details on the differences between the different types of analyses are described below.

The SIEM system 201 may dedicate computing resources to perform one or more of the analyses. For example, to perform an analysis, the SIEM system 201 can create an isolated environment to which a set of computing resources, such as computer memory, processing power, etc., is dedicated. The computing resources may be used by the SIEM system 201 to execute, inspect, or otherwise process the contents of data packets. The isolated environment may help prevent the contents of such data packets from accessing other resources in the node 110A and/or may help prevent unauthorized or unintended actions from being executed by the contents of such data packets.

The computing resources dedicated to an isolated environment may be different depending on the type of analysis to be performed using the computing resources. For example, because the analysis performed by the SIEM system 201 may be different depending on the source and/or destination of a data packet, different computing resources can be dedicated for a particular type of analysis such that the SIEM system 201 can perform specific and different functions that are tailored toward the types of threats that may originate from transmissions via the private network 101 and/or transmissions via the public network 210 or cellular network 220 (not shown).

As described herein, the node 110A may receive data packets from external devices through the public network 210 or through the cellular network 220 (not shown). In some instances, such data packets may be unsecure—the contents of the data packets may include malware, corrupted data, or otherwise suspicious information. The second type of analysis performed by the SIEM system 201, conceptually represented at the location 802, may be deployed to analyze inbound data packets transmitted over the public network 210 and/or the cellular network 220 (not shown) for threats. During the second type of analysis, the SIEM system 201 can retrieve the third party threat data received from external sources. The SIEM system 201 may then perform external threat management by, for example, analyzing the inbound data packets using the third party threat data. For example, the third party threat data can include lists or ranges of suspicious or malicious IP addresses and the STEM system 201 can compare the inbound data packets with these IP addresses to identify suspicious data packets (e.g., the SIEM system 201 can analyze the header of an inbound data packet to see if the header includes a malicious IP address as a source address or destination address). If a match is found, the corresponding data packet or packets are dropped and blocked from further entry into the node 110A. As another example, the third party threat data can include threat signatures, which are digital signatures of existing, known threats that can be received from external sources and stored in the node 110A (e.g., in a data storage device accessible by the active threat detector 203 and/or the firewall 204). The STEM system 201 can generate signatures of inbound data packets (e.g., using the same digital signature algorithm as used to generate the threat signatures) and compare the generated signatures with the threat signatures. If a match is found, the corresponding data packet or packets are dropped and blocked from further entry into the node 110A. The SIEM system 201 may use one of a plurality of digital signature algorithms, such as the Digital Signature Algorithm (DSA) specified in FIPS 186-1 or its successors, a message digest algorithm such as MD5, or other like algorithms to generate the inbound data packet signatures.

One or more data packets that are not dropped or blocked based on the second type of analysis may be further inspected by the SIEM system 201 using the third type of analysis, conceptually represented at the location 804. During the third type of analysis, the SIEM system 201 may perform malware and/or behavioral analysis, which takes into account parameters and constraints of the node 110A and/or the public network 210 or the cellular network 220 (not shown). For example, the STEM system 201 may store behavior information related to the types of data packets normally transmitted and received via the public network 210 (or the cellular network 220) and the source and/or destination of such data packets. The SIEM system 201 may then inspect the source and/or destination addresses of current data packets and drop data packets that include unusual source and/or destination addresses as indicated by the behavior information. As another example, the SIEM system 201 may store permitted source and/or destination addresses. The SIEM system 201 may block data packets with an address outside of the permitted address values. Behavioral analysis may be performed on malware. For example, a malware specimen may be analyzed for its interactions with computing resources such as file systems, operating system processes and/or components, networks, etc. The SIEM system 201 may provide behavior monitoring tools and create an isolated environment in the system to permit behavioral analysis. The SIEM system 201 may perform behavioral analysis through allowing a malware specimen to infect the isolated environment, analyze interactions of the malware with computing resources, and/or modify computing resources available to the isolated environment to analyze the malware's behavior (e.g., changes in response to modification of available computing resources).

The STEM system 201 can additionally inspect outbound data packets (e.g., data packets transmitted by the node 110A over the public network 210 or the cellular network 220). Such inspection may be performed for the purpose of data logging and event management (e.g., logging traffic events to particular destination addresses).

The third type of analysis may be a deeper, more granular analysis than the second type of analysis. For example, the SIEM system 201 may commit a larger amount of computing resources to perform the third type of analysis as compared to the second type of analysis. The third type of analysis may also be more resource intensive than the second type of analysis, resulting in a longer analysis period as compared to the second type of analysis.

As described herein, the node 110A may be coupled to other nodes (e.g., nodes 110B and 110C) within the multi-node environment via the dedicated private network 101. The SIEM system 201 of node 110A may route data traffic to and from an external network, such as the public network 210, and/or to and from another node in the multi-node environment. The SIEM system 201 may perform the first type of analysis to inspect data traffic between two nodes on the dedicated private network 101, conceptually represented at the location 806. The SIEM system 201 can inspect both inbound and outbound data packets (e.g., the SIEM system 201 in node 110A may inspect data packets transmitted from node 110A to node 110B and/or transmitted from node 110B to node 110A). A neighboring node (e.g., node 110B) can also have the ability to perform the first type of analysis when receiving data transmitted by the node 110A or any other node in the multi-node environment. Thus, an inspection tag may be attached to a data packet by the STEM system 201 of the node 110A after completing the first type of analysis such that the receiving node (e.g., node 110B) does not repeat the analysis. For example, this inspection tag indicates whether a corresponding data packet has been inspected by an SIEM system 201 in a node within the dedicated private network 101. The SIEM system 201 may be configured to not inspect data packets that include inspection tags indicating that the respective data packets have already been inspected by another SIEM system 201 in the multi-node environment, thereby eliminating duplicate inspections and increasing efficiency. As an example, the SIEM system 201 may perform firewall blocking, port analysis, and/or in-line blocking during the first type of analysis. These techniques can block exploits based on an analysis of the internal usage of the contents of a data packet.

For Example, a Permanent Virtual Circuit (PVC) can be defined by the SIEM system 201 and used to connect an external server to the SIEM system 201. A specific port number may be assigned to a particular server. Data transferring from the server across the PVC can then be restricted to use that assigned specific port number. The firewall can be configured to permit only traffic across this port and block all other traffic. The firewall can inspect the packet header for permitted IP source and destination addresses and for permitted port access. For example, specific services such as Mail (Simple Mail Transfer Protocol or SMTP, Post Office Protocol or POP) and WEB (HTTP port 80, SSL port 443) are commonly used to move specific data through designated ports relative to their services. The SIEM system 201 can be configured to permit only traffic through a port designated to the traffic type.

In relation to the components of the multi-node environment illustrated in FIG. 2A, inbound data traffic can enter node 110A through either public network 210 or private network 101, pass through router 202, active threat detector 203, and firewall 204, and be received by switch 212 if the second and/or third type of analyses do not result in the dropping or blocking of the data packet. Outbound data packets may pass through switch 212, firewall 204, active threat detector 203, and router 202 to either public network 210 or private network 101. Although both public network 210 and private network 101 traffic share the same physical routes within node 110A, the active threat detector 203 and/or the firewall 204 can distinguish public network 210 data packets from private network 101 data packets based on, for example, addresses within the data packets. The active threat detector 203 and/or the firewall 204 can then perform the types of analyses intended for the respective types of traffic. Border Gateway Protocol is an example protocol which may enable traffic management and differentiation.

In an embodiment, the SIEM system 201 performs the first, second, and/or third type of analysis on all data packets transmitted or received via the public network 210, the cellular network 220 (not shown), or the private network 101. In other embodiments, the SIEM system 201 performs the first, second, and/or third type of analysis on selected data packets. For example, a data packet may be selected for the first, second, and/or third type of analysis based on a configuration of the active threat detector 203 and/or the firewall 204 (e.g., the components may be configured to analyze certain types of data packets, data packets that have a certain source address, etc.). As another example, a data packet may be selected for the third type of analysis if the data packet was selected for the second type of analysis (and passed the second type of analysis). As another example, a data packet may be selected for the first, second, and/or third type of analysis based on a received threat alert (e.g., the SIEM system 201 has been notified by an external source or another node in the multi-node environment that a threat is expected or an attack has occurred). The SIEM system 201 may select the first few and/or last few data packets of a data flow when a threat alert is received. As another example, a data packet may be selected for the first, second, and/or third type of analysis if data packets similar to a received or transmitted data packet were dropped or blocked in the past.

Integrated Control and Data Management Interface

Generally, data is collected by various devices and then pushed to a centralized database. Once at the centralized database, the data can be processed (e.g., batch, Hadoop, etc.) and displayed to a user. However, the transfer of data to the centralized database can pose a security risk and cause network latency. For example, the data is often transferred over a public network, such as the Internet, leaving the data vulnerable to interception by malicious actors. Often, the amount of data collected by the various devices is very large (e.g., gigabytes to terabytes of data) and the transfer of the data to the centralized database can reduce the amount of bandwidth available for other traffic. To avoid these issues, the data could be stored locally to the device or system that generated the data. However, it may be difficult to process data across different systems given that each of the systems may reside on a separate private network and the data may be stored in incompatible formats.

Accordingly, described herein is an integrated control and data management interface that can avoid the issues described above. For example, data may be stored in databases local to the devices or systems that generated the data. The devices and/or systems may also be physically coupled to the same private network. The integrated control and data management interface can function in the control plane of the private network, thereby gaining access to the databases without having to access a public network (e.g., the integrated control and data management interface can connect to the databases "out-of-band" (e.g., via a private network) rather than "in-band" (e.g., via a public network)). The integrated control and data management interface can also access and/or process data stored in the databases local to the devices or systems via calls (e.g., application program interface (API) calls) to the various databases. The structure of the calls may remain static such that even if the formatting or mapping of the data in one or more of the databases changes, the integrated control and data management interface can still use the same calls to access and/or process the data. In this way, the integrated control and data management interface can provide a single user interface for device interaction and analysis.

Figure 9:
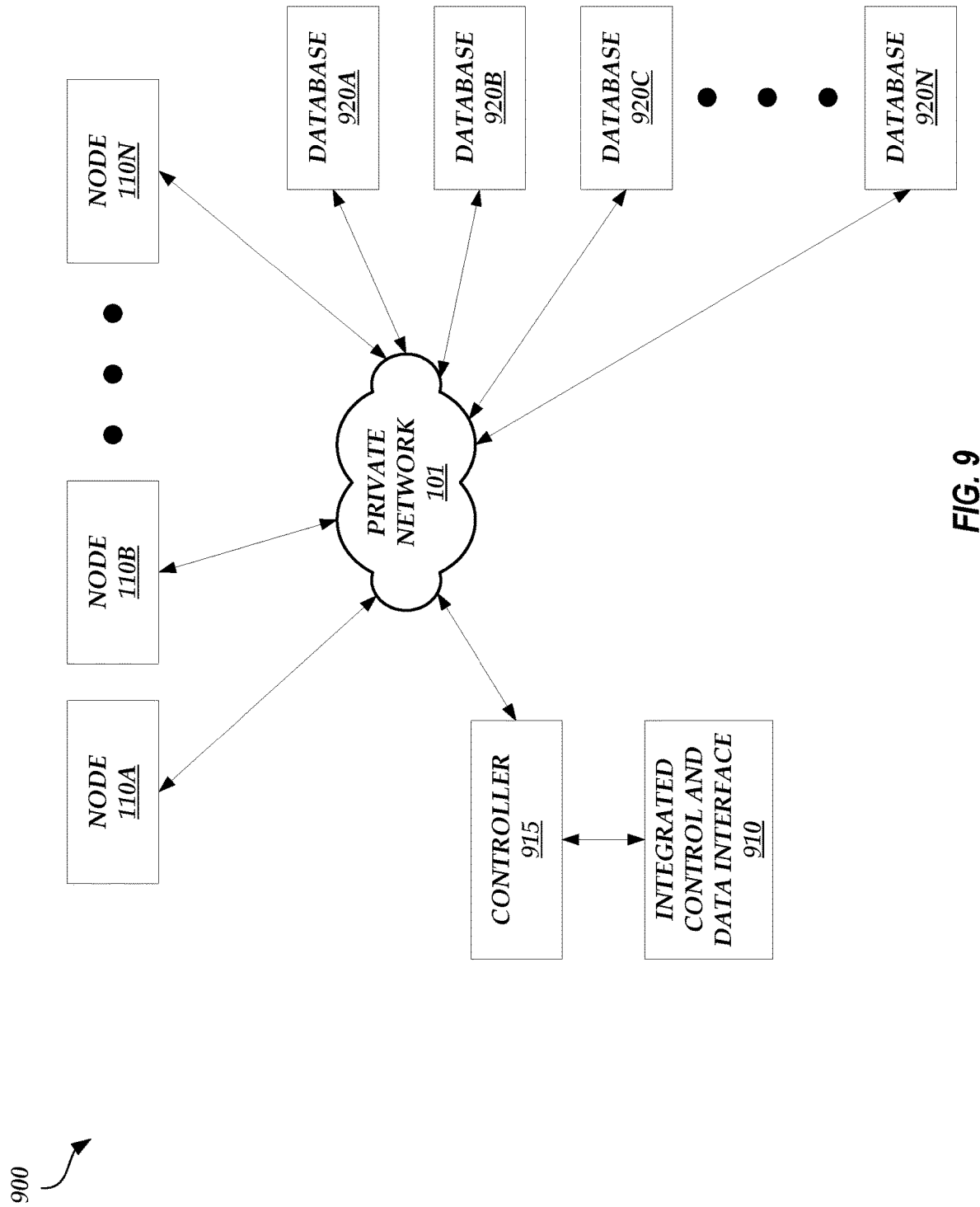
FIG. 9 illustrates an example integrated control and data management interface network.

FIG. 9 illustrates an example integrated control and data management interface network 900. As illustrated in FIG. 9, integrated control and data interface 910 is an example integrated control and data management interface described above. The integrated control and data interface 910 can be any physical computing system, such as a mobile device, desktop, workstation, server, and/or the like. The integrated control and data interface 910 can execute message-oriented middleware (MOM) that supports the sending and receiving of messages between nodes 110A-N and databases 920A-N

In an embodiment, the integrated control and data interface 910 communicates with the private network 101 via a controller 915. For example, the controller 915 can represent a network operation center (or a network management center) that includes network monitoring equipment to control, manage, or otherwise monitor the private network 101. The controller 915 may also include a route optimization system (e.g., a MANAGED INTERNET ROUTE OPTIMIZER controller) that automatically manages network protocols (e.g., Border Gateway Protocol (BGP)) and re-routes traffic. Thus, the integrated control and data interface 910 can access the control plane of the private network 101 via the controller 915. In alternative embodiments, the integrated control and data interface 910 communicates directly with the private network 101.

The databases 920A-N can be databases that store data local to a system or device. For example, the databases 920A-N can each be associated with a third party and store data generated by the respective third party. The third parties can be any system or service that generates data, such as a network-accessible ticketing service, a system of sensors (e.g., sensors associated with oil wells or oil pipelines), a credit card processing service, and/or the like.

The nodes 110A-N and databases 920A-N may each be physically located in different geographic locations. However, the nodes 110A-N and the databases 920A-N may have access to the private network 101 and other networks, such as public networks (not shown). Thus, the integrated control and data interface 910 can communicate with the nodes 110A-N and the databases 920A-N via the private network 101, thereby avoiding public networks, such as the public network 210 or the cellular network 220, and the data vulnerabilities associated with such networks.

The integrated control and data interface 910 can use calls (e.g., API calls) to query the databases 920A-N and/or the databases of the nodes 110A-N (e.g., storage servers 208) via the private network 101. For example, the integrated control and data interface 910 can transmit a query call to the database 920A via the private network 101. Instead of creating artifacts associated with the data stored in the database 920A (which can contaminate data and/or results) and/or using private network 101 bandwidth to transfer the data stored in the database 920A to the integrated control and data interface 910, the integrated control and data interface 910 can construct the query call such that any processing associated with the query call is executed locally by the database 920A (or the system operating the database 920A) and a processed result is transmitted to the integrated control and data interface 910 (e.g., a result that includes a response to the query). The integrated control and data interface 910 can transmit the same query to multiple nodes 110A-N and/or databases 920A-N such that the integrated control and data interface 910 effectively processes data stored locally in different databases as if the data was actually all stored in a centralized database.

In addition, the integrated control and data interface 910 can display the results of a query (or stored data) within a single interface, such as a single user interface, without creating multiple connections to different nodes 110A-N and/or databases 920A-N. For example, generally to be able to view data stored in database 920A and data stored in database 920B, a device would need to establish a first connection (e.g., a first tunnel) with the database 920A, collect the desired data from the database 920A, close the first connection, separately establish a second connection (e.g., a second tunnel) with the database 920B, and then collect the desired data from the database 920B. The connections may be serially established and closed because the connections are secure and a device generally cannot establish multiple secure connections at once, especially when such connections require the device to connect with a network outside of the network to which the device is associated.

However, here, the integrated control and data interface 910 may not need to establish two separate connections to access the data stored in the databases 920A-B. Instead, the integrated control and data interface 910 can use the internal routing protocol of the private network 101 (because the integrated control and data interface 910 access the private network 101 via the control plane) to communicate with the various nodes 110A-N and/or the databases 920A-N. For example, the database 920A may be assigned an internal network address. The integrated control and data interface 910 can use this internal network address to access the database 920A (where the internal routing protocol routes packets such that any calls initiated by the integrated control and data interface 910 are received by the database 920A). Thus, there is no need to serially establish and close connections to the nodes 110A-N and/or the databases 920A-N. The integrated control and data interface 910 can access multiple nodes 110A-N and/or the databases 920A-N at the same time (e.g., the internal network address of the database 920A can be used to display database 920A data in a first window of the user interface and the internal network address of the database 920B can be used to display database 920B data in a second window of the user interface concurrently with the first window).

Double-Encryption Network Connection

As described above with respect to FIG. 5, a node 110 can include an encryption key management system 205, where the encryption key management system 205 includes the EKM system 501, the LKM 502, and one or more SEDs 503. As described above with respect to FIG. 6, the EKM system 501 of one node 110 can communicate with the EKM system 501 of another node 110 so that both EKM systems 501 can exchange generated encryption keys. In some embodiments, a node 110 can include the encryption key management system 205 and one or more separate encryption key management systems that are each associated with a specific user. The encryption key management system 205 and the one or more separate encryption key management systems can be used to secure a network connection between the node 110 and a user system, as described below with respect to FIG. 10.

Figure 10:
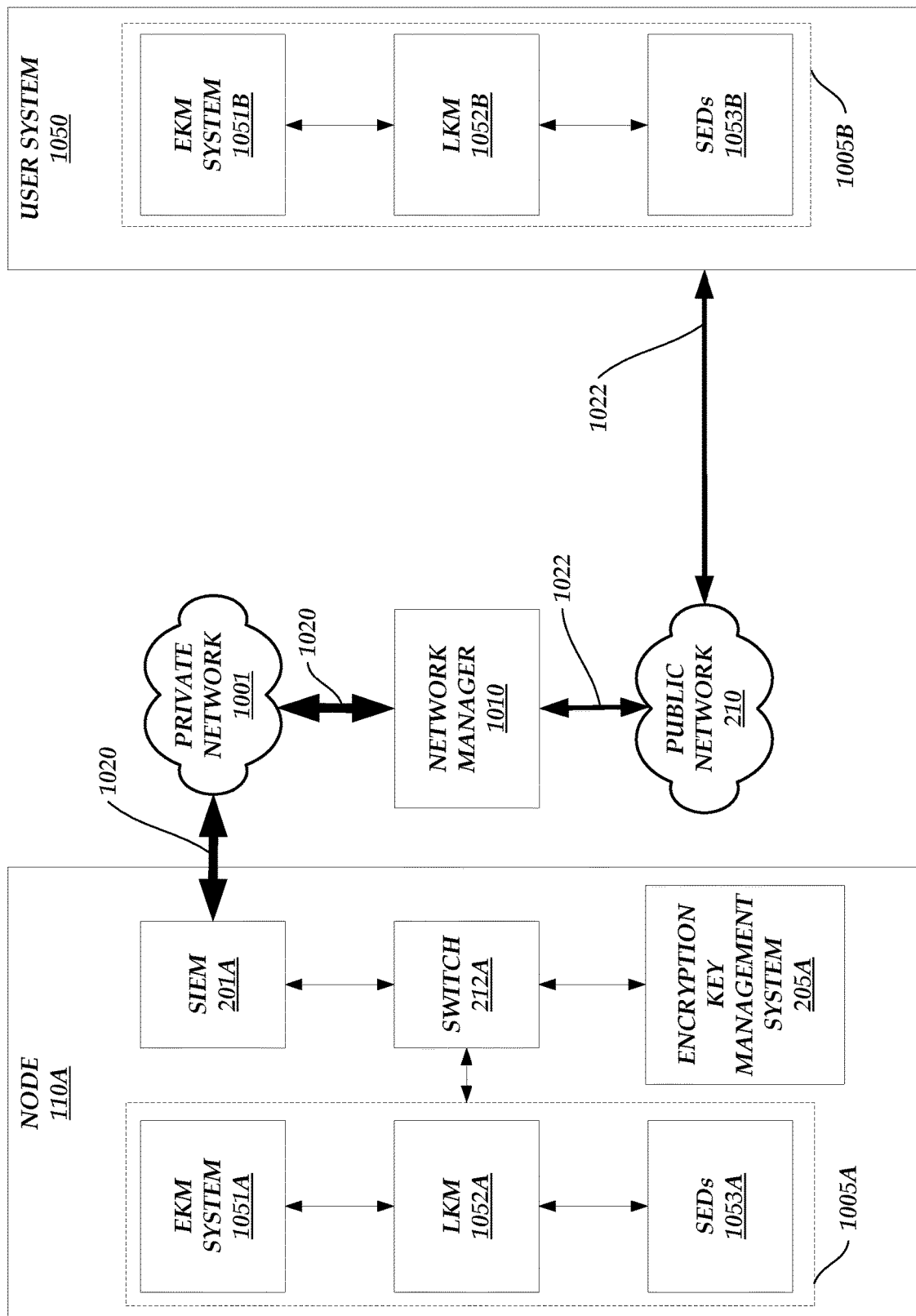
FIG. 10 illustrates a double-encryption environment between a node and a user system.

FIG. 10 illustrates a double-encryption environment between a node 110A and a user system 1050. As illustrated in FIG. 10, the node 110A includes the SIEM system 201A, the switch 212A, the encryption key management system 205A, other components of the node 110A illustrated in FIGS. 2A-2B, and a user encryption key management system 1005A. The user encryption key management system 1005A may include the same components as the encryption key management system 205A. For example, the user encryption key management system 1005A includes an EKM system 1051A, an LKM 1052A, and one or more SEDs 1053A. The user encryption key management system 1005A may be associated with a specific user (e.g., the user that manages the user system 1050) and may be isolated from other components of the node 110A aside from the switch 212A. For example, the data stored in the one or more SEDs 1053A may have restricted access such that only certain components of the node 110A can access such data (e.g., the one or more processing servers 206 may access the data via the switch 212A to perform one or more actions at the request of the user system 1050). While the node 110A is depicted as having a single user encryption key management system 1005A, this is not meant to be limiting. The node 110A can include any number of user encryption key management systems, where each user encryption key management system is associated with a different user and/or user system 1050.

The node 110A may communicate with a network manager 1010 via the SIEM system 201A using a private network 1001 (e.g., a privately accessible network of linked networks, possibly operated by various distinct parties, such as a personal area network, local area network, wide area network, cable network, satellite network, cellular telephone network, etc. or combination thereof, each with access to and/or from the Internet) only accessible to the network manager 1010 and the node 110A. Likewise, the user system 1050 may communicate with the network manager 1010 using the public network 210. Thus, the node 110A and the user system 1050 may communicate via the private network 1001 and the public network 210. Connection 1020 between the SIEM system 201A and the network manager 1010 over the private network 1001 may have double encryption, whereas connection 1022 between the network manager 1010 and the user system 1050 over the public network 210 may have single encryption, as described in greater detail below.

The network manager 1010 may be a system that includes computer hardware (e.g., a processor, memory, modem, etc.) and that is managed by a network provider, such as an Internet service provider. The network provider may manage at least some components within the public network 210. The network provider may also manage the private network 1001 alone or in conjunction with the entity managing the node 110A. The network manager 1010 may serve as an interface between the private network 1001 and the public network 210. In some embodiments, the network manager 1010 can function as a firewall by blocking data packets from being transmitted within the private network 1001 if such data packets or the data within such data packets are not encrypted.

The user system 1050 may be a system managed by a user that locally stores user data (e.g., data measured by electronic or IoT devices 211, transactional data, medical data, etc.). The user system 1050 may include a user encryption key management system 1005B that includes the same components as the user encryption key management system 1005A. For example, the user encryption key management system 1005B may include the EKM system 1051B, the LKM 1052B, and one or more SEDs 1053B. The one or more SEDs 1053B may store user data in an encrypted format (e.g., encrypted using encryption keys generated by the EKM system 1051B). The user system 1050 may also include other storage devices, not shown, for locally storing user data. As an illustrative example, the user system 1050 can be a system located on the premises of an entity (e.g., a manufacturing company, a pipeline operator, a credit card company, a hospital, etc.) that manages and/or owns the user data.

Because the user encryption key management system 1005A is associated with the user system 1050, the user encryption key management system 1005A and the user encryption key management system 1005B may communicate with each other (e.g., the EKM system 1051A and the EKM system 1051B may communicate with each other) to facilitate key exchange. The key exchange may take place to encrypt a connection between the node 110A and the user system 1050 and to allow the node 110A to process user data. For example, while the user data may be stored locally in the user system 1050 (and therefore secure), the amount of user data may be large (e.g., gigabytes, terabytes, etc.) and the cost of processing such data (e.g., aggregating the data, identifying trends in the data using machine-learning or other techniques, filtering the data, etc.) may be high (e.g., financially expensive and expensive in terms of computing resources needed to process the large amount of data). Thus, the processing resources available to the node 110A could be leveraged to perform the desired data processing. However, as described herein, the user data may be extremely sensitive and/or confidential. Accordingly, it may be important for a connection to be secure before a copy of some or all of the user data is transferred across a network.

To secure the connection 1020 and the connection 1022, the EKM system 1051A or 1051B can generate an encryption key that is used to encrypt some or all of the data transferred across the connections 1020 and 1022. For example, user data stored in the one or more SEDs 1053B may be encrypted. The LKM 1052B can retrieve an encryption key to allow the one or more SEDs 1053B to decrypt the user data to be transmitted to the node 110A for processing. The LKM 1052B can then receive the same encryption key or another encryption key from the EKM system 1051B to encrypt the user data for transport across the connection 1022 and the connection 1020. Alternatively, the SEDs 1053B does not decrypt the user data and the encrypted user data is transmitted to the node 110A.

The encrypted user data passes through the connection 1022 and arrives at the network manager 1010. The EKM system 501 of the encryption key management system 205A may generate a second, separate encryption key that is used to encrypt data traveling along the connection 1020. For example, the EKM system 501 may transmit the second encryption key to the network manager 1010. The network manager 1010 can then encrypt the encrypted user data using the second encryption key. Thus, the user data is encrypted twice. The network manager 1010 can then forward the double-encrypted user data along the connection 1020 to the SIEM system 201A.

The SIEM system 201A passes the double-encrypted user data to the switch 212, which then forwards the double-encrypted user data to the user encryption key management system 1005A. The user encryption key management system 1005A can request the second encryption key from the encryption key management system 205A via the switch 212A and decrypt the outer encryption layer of the double-encrypted user data using the second encryption key. Alternatively, the SIEM system 201A or the switch 212A can request the second encryption key from the encryption key management system 205A and decrypt the outer encryption layer of the double-encrypted user data or the double-encrypted user data can be passed to the encryption key management system 205A for decryption of the outer encryption layer.

Because the user data is also encrypted using an encryption key generated by the EKM system 1051B, the EKM system 1051B coordinates with the EKM system 1051A to indicate the encryption key that was used to encrypt the user data. The EKM system 1051B can either forward the encryption key to the EKM system 1051A (e.g., by encrypting the encryption key using another encryption key available to the EKM system 1051A and transmitting the encrypted encryption key along the connections 1020 and 1022) or provide the information necessary for the EKM system 1051A to generate and/or retrieve the same encryption key. For example, both EKM systems 1051A-B may use the same techniques to generate encryption keys such that each generates encryption keys in the same order or sequence. The EKM system 1051B can then indicate to the EKM system 1051A which encryption key in sequence was used to encrypt the user data, which then allows the EKM system 1051A to generate and/or retrieve the appropriate encryption key for decryption of the encrypted user data.

Once the encryption key is identified, the user encryption key management system 1005A can use the encryption key to decrypt the now single-encrypted user data and send the decrypted user data to the one or more processing servers 206 via the switch 212A. The user system 1050 may separately transmit an instruction to the node 110A via the connections 1020 and 1022 that instructs the node 110A to perform a certain operation (e.g., data aggregation, trend identification, data filtering, etc.) such that the one or more processing servers 206 perform the appropriate actions on the decrypted user data. Alternatively, the instruction can be sent in conjunction with the encrypted user data (e.g., the instruction may be encrypted as well and, after the instruction is decrypted, the user encryption key management system 1005A can transmit the decrypted instruction to the one or more processing servers 206 via the switch 212A such that the one or more processing servers 206 process the user data accordingly to the decrypted instruction).

After the decrypted user data is processed, the processed user data is transmitted by the one or more processing servers 206 back to the user encryption key management system 1005A via the switch 212A. The user encryption key management system 1005A can encrypt the processed user data using an encryption key generated by the EKM system 1051A or received from the EKM system 1051B (e.g., either the same encryption key used to encrypt the user data when transmitted by the user system 1050 or a different encryption key). The user encryption key management system 1005A can then request an encryption key from the encryption key management system 205A to use for encrypting the encrypted processed user data. The encryption key provided by the encryption key management system 205A can be the same second encryption key used to encrypt the encrypted user data by the network manager 1010 or a different encryption key. Alternatively, the encrypted processed user data can be passed to the switch 212A, the SIEM system 201A, and/or the encryption key management system 205A to encrypt the processed user data a second time. Thus, the processed user data is encrypted twice: once using an encryption key provided by the user-specific user encryption key management system 205A and once again using an encryption key provided by the encryption key management system 205A.

The double-encrypted processed user data can then be transmitted by the node 110A to the network manager 1010 along the connection 1020 through the private network 1001. The network manager 1010 can then use the encryption key provided by the encryption key management system 205A to decrypt the outer encryption layer of the double-encrypted processed user data. The network manager 1010 can then transmit the now single-encrypted processed user data to the user system 1050 along the connection 1022 through the public network 1022. Once the user system 1050 receives the single-encrypted processed user data, then EKM system 1051B can provide an encryption key that can be used to decrypt the encrypted processed user data (e.g., based on communications with the EKM system 1051A to identify which encryption key was used to encrypt the processed user data and/or to receive the encryption key used to encrypt the processed user data). The decrypted processed user data can then be stored in the one or more SEDs 1053B and/or other storage systems. When stored in the one or more SEDs 1053B, the decrypted processed user data may be encrypted using an encryption key provided by the EKM system 1051B via the LKM 1052B.

While FIG. 10 depicts one user system 1050, this is not meant to be limiting. For example, multiple user systems may connect with the network manager 1010 via the public network 210. Data transmitted between the network manager 1010 and the various user systems (e.g., via connection 1022 and other connections, not shown) may be encrypted using an encryption key provided by the EKM system 1051 of the respective user system. Data transmitted between the network manager 1010 and the node 110A (e.g., via connection 1020) may be double-encrypted, where the data encrypted using the encryption keys provided by the EKM system 1051 of the respective user system is encrypted again using an encryption key provided by the EKM system 501 of the encryption key management system 205A. Thus, the connection 1020 may carry multiple channels of double-encrypted data, where data in each channel is encrypted using a common encryption key (e.g., the encryption key provided by the EKM system 501 of the encryption key management system 205A) and a unique encryption key (e.g., the encryption key provided by the EKM system 1051 of the user system associated with the respective data). Alternatively, data in each channel can be encrypted using unique encryption keys (e.g., the EKM system 501 of the encryption key management system 205A can provide different encryption keys to the network manager 1010, one for each channel).

Device Worlds

As described herein, a user can access a node 110A-N to provide login information and attributes or parameters for an IoT device, such as one of the electronic devices 211, 311, and/or 411. Electronic device attributes or parameters (e.g., IoT device attributes or parameters) can include device settings (e.g., a time of day that the electronic device operates, a temperature value if the electronic device is a thermostat, etc.), device measurements, and/or any other values that define the characteristics of or the behavior of the electronic device.

When providing the login information and attributes or parameters, the user can also group electronic devices into the same environment or device world and assign global parameters (e.g., world parameters) to the device world. As used herein, a "device world" is a user-defined grouping or aggregation of electronic devices, where each electronic device in the device world is configured to operate according to the global parameters assigned to the device world. The electronic devices grouped into the same device world can be related. For example, a user may operate a pipeline. The electronic devices may be sensors that measure various parameters associated with the pipeline, such as temperature, pressure, flow, etc. Because the electronic devices are used to monitor the same structure (e.g., the pipeline), a set of global parameters may govern how the electronic devices operate. As another example, a first electronic device can be a thermostat and a second electronic device can be a wearable human body monitor. The first and second electronic devices may be configured with a set of global parameters such that the temperature of the person wearing the wearable human body monitor has a constant body temperature.

Using the provided login information, the node 110A-N can periodically poll the electronic devices in a device world, a server that manages the electronic devices in the device world (e.g., the server 230), and/or electronic devices not assigned to any device world to determine whether the electronic devices are operating according to the device attributes and/or the global parameters. If the node 110A-N polls the electronic devices directly and determines that an electronic device is operating outside of the defined device attributes and/or global parameters, the node 110A-N can generate an alert or notification to inform the user that the electronic device is operating incorrectly and/or can transmit a message to the electronic device to instruct the electronic device to adjust the device parameter that has caused the electronic device to operate outside of the defined device attributes and/or global parameters. If the node 110A-N polls the server that manages the electronic devices and determines that an electronic device is operating outside of the defined device attributes and/or global parameters based on the feedback provided by the server, the node 110A-N can generate an alert or notification to inform the user that the electronic device is operating incorrectly and/or can transmit a message to the server managing the electronic device to instruct the electronic device to adjust the device parameter that has caused the electronic device to operate outside of the defined device attributes and/or global parameters.

On-Premise to Cloud

Figure 11A:
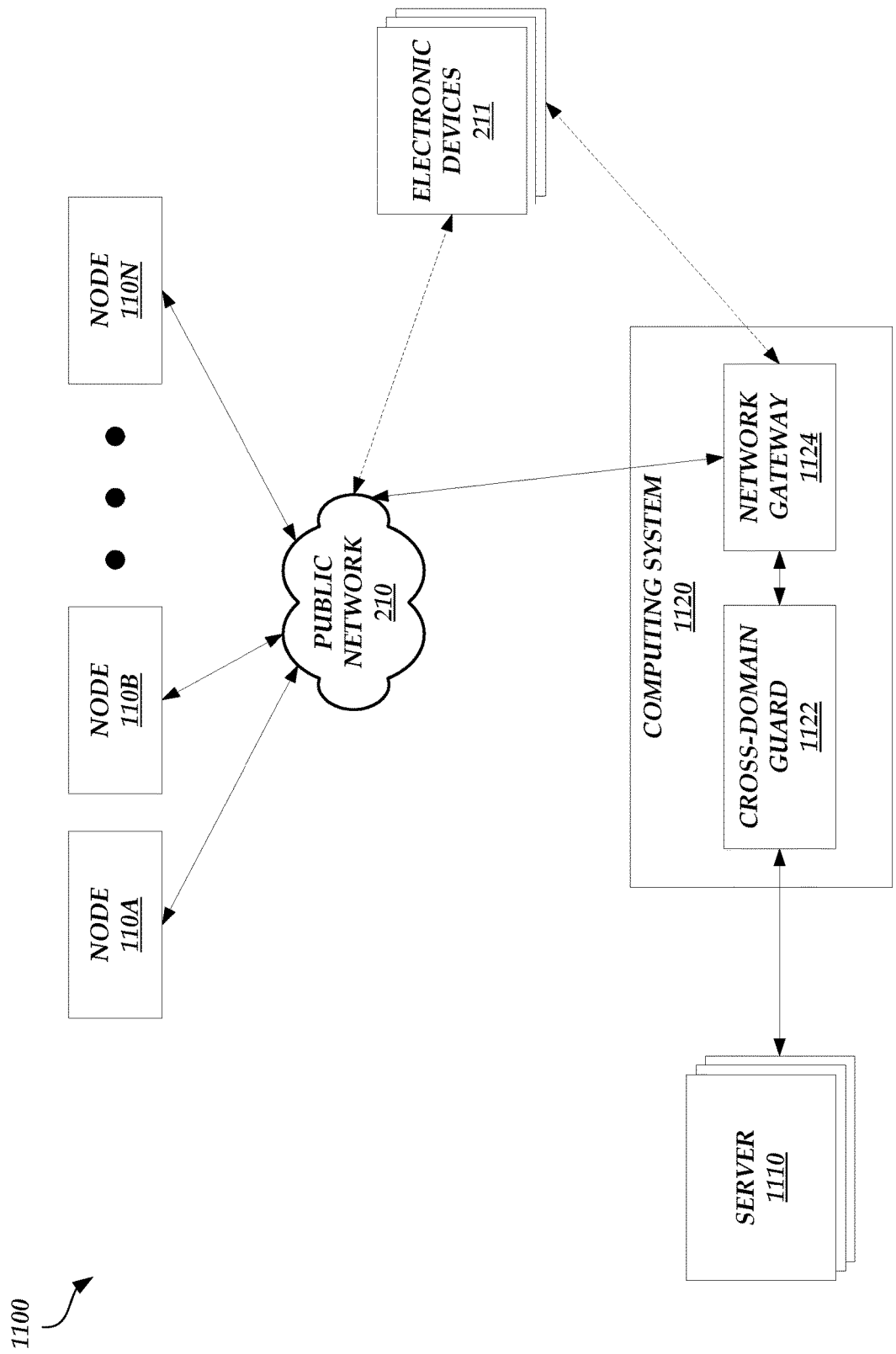
FIGS. 11A-11E are block diagrams of an "on-premise to cloud" environment in which data managed by an entity (e.g., an individual, a company, a business, etc.) and stored locally at the entity's place of operation (e.g., in one or more servers located at the place of operation) and/or stored at a location accessible by the entity (e.g., in one or more servers at a data center) can be securely transmitted to a node of FIG. 1 via the public network, the cellular network, and/or the private network.
Figure 11B:
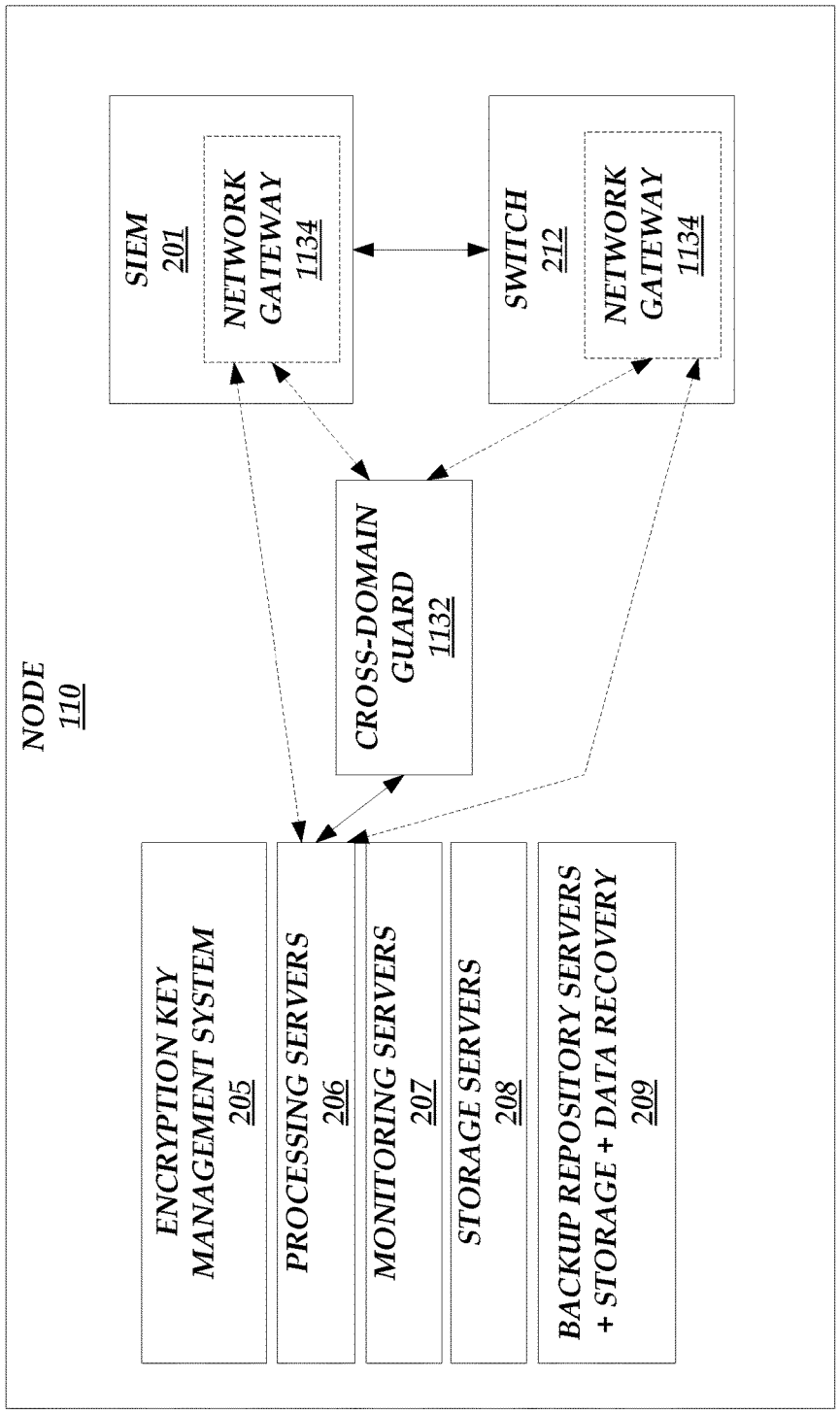

FIGS. 11A-11E are block diagrams of an "on-premise to cloud" environment 1100 in which data managed by an entity (e.g., an individual, a company, a business, etc.) and stored locally at the entity's place of operation (e.g., in one or more servers 1110 located at the place of operation) and/or stored at a location accessible by the entity (e.g., in one or more servers 1110 at a data center) can be securely transmitted to a node 110A-N via the public network 210, the cellular network 220, and/or the private network 101. For example, as illustrated in FIG. 11A, the entity's place of operation and/or the data center may include a computing system 1120 (e.g., with one or more hardware processors, memory, a network interface, a bus, etc.) that functions as a cross-domain guard (referred to herein as a cross-domain guard device 1122) and a network gateway 1124 (e.g., a DISPERSIVE virtualized network (DVN) gateway). A "data center" may refer to a portion of a building or other physical structure, a building or other physical structure, portions of a set of buildings and/or other physical structures, or a set of buildings and/or other physical structures used to house computing systems (such as one or more servers 1110) and associated components or devices (e.g., networking or telecommunication components, storage components, power supplies, etc.) that are used to store, process, and/or communicate data. The entity's place of operation and/or the data center may be referred to herein as "on-premise" or "on-prem."

The cross-domain guard device 1122 may be positioned logically between the server(s) 1110 that store entity data and the network gateway 1124. The cross-domain guard device 1122 may control whether data can pass from one security domain to another security domain. Unlike a firewall, the cross-domain guard device 1122 does not simply transmit individual data packets at the transmission control protocol (TCP)/Internet protocol (IP) layer. Rather, the cross-domain guard device 1122 may be configured with computer-executable instructions that, when executed, cause the cross-domain guard device 1122 to inspect the content of data packets received from the network gateway 1124 and destined for the server(s) 1110 storing entity data and/or to inspect the content of data packets received from the server(s) 1110 storing entity data and destined for the network gateway 1124 (and other systems). In particular, the cross-domain guard device 1122 can assembly one or more data packets into a single message within a sandboxed environment, and then analyze content of the single message to determine whether the content satisfies one or more rules. Based on the analysis, the cross-domain guard device 1122 may allow the data packet(s) to pass (e.g., if the analysis results in a determination that the single message does not include words, files, macros, attachments, and/or other content that are not allowed to be sent to the destination given the destination's security domain level, as determined by one or more rules), may redirect the data packet(s) (e.g., for further analysis), may drop the data packet(s) (e.g., if the analysis results in a determination that the single message includes words, files, macros, attachments, and/or other content that is not allowed to be sent to the destination given the destination's security domain level, as determined by one or more rules), and/or may quarantine the data packet(s) (e.g., for further analysis). In some embodiments, the cross-domain guard device 1122 may translate one or more data packets into a common format prior to the analysis.

The cross-domain guard device 1122 can therefore prevent sensitive data (e.g., classified data) from being transmitted to an unsecure domain. In general, the cross-domain guard device 1122 can prevent data with a high classification from being transmitted to a domain with a low classification, but can allow data with a low classification to be transmitted to a domain with a high classification.

The network gateway 1124 may be configured to communicate with other network gateways 1124 present in other systems via the public network 210 and/or the cellular network 220. In particular, the network gateway 1124 may run an application that intercepts data packets at Layer 2, 3, and/or 4. The application can then communicate with a session controller (e.g., a hardware device located external to the entity's place of operation, the data center, and/or the destination system) that can confirm that the network gateway 1124 is allowed to communicate with another network gateway 1124, can establish communication protocols for a session, and/or can inform the source network gateway 1124 (e.g., the network gateway present in the entity's place of operation and/or the data center) and the destination network gateway 1124 (e.g., a network gateway operating in a node 110, as described in greater detail below) of which network paths to use to transmit data. The application running on the source network gateway 1124 can then, once one or more data packets are received, split the data packet(s) into one or more sub-packets, where the sub-packets are not duplicates of each other. The application can then transmit, to the destination network gateway 1124 over the public network 210 and/or the cellular network 220, each sub-packet over a different, independent network path identified by the session controller. Each network path may include a device referred to as a "deflect," which relays network traffic between endpoints. In some embodiments, the application encrypts the sub-packets prior to transmission.

The destination network gateway 1124 may also run an application, and the destination network gateway 1124 application can receive the sub-packets transmitted over the different network paths. Once received, the destination network gateway 1124 application can decrypt the sub-packets and/or reassemble the sub-packets into the original data packet(s). Thus, the destination network gateway 1124 now possesses the data packet(s) that the source network gateway 1124 intended to transmit. To transmit data from a remote system (e.g., a node 110A-N) to the entity's place of operation and/or the data center, the destination network gateway 1124 can perform the operations of the source network gateway 1124, and vice-versa.

By splitting the data packet(s) into sub-packets and then transmitting the sub-packets over different network paths, the negative consequences of man-in-the-middle attacks can be mitigated. For example, if the data packet(s) were transmitted over the same network path, if a malicious actor or device was present in the network path, the malicious actor or device could obtain all of the information transmitted by the source network gateway. However, now that only a portion of the data packet(s) is transmitted over any one network path, even if a malicious actor or device was present in one of the network paths, the malicious actor or device would not be able to obtain all of the information being transmitted by the source network gateway 1124. Rather, the malicious actor or device would only be able to obtain a portion of the transmitted information, and such information may be unusable if the data packet(s) are split in a manner such that the information is only usable if the sub-packets are combined.

As mentioned above and as illustrated in FIG. 11B, a node 110A-N can include a network gateway, such as network gateway 1134. For example, the switch 212 may include a network gateway 1134 and/or the SIEM 201 may include a network gateway 1134. Each node 110A-N may include the network gateway 1134 such that data can be transmitted to and/or from an entity's place of operation and/or the data center in a more secure manner than is possible with current virtualized private network (VPN) and/or other tunneling technologies. For example, VPN applications generally transmit data over a single network path, which can be problematic for the reasons discussed above. Each node 110A-N may further include a cross-domain guard device 1132 positioned logically between the network gateway 1134 and the storage servers 208 such that data associated with one security domain level is not transmitted to a system with a lower security domain level.

In a simple use case, a user may wish to transmit data from the entity's place of operation and/or the data center to a node 110A-N so that the data can be processed by a node 110A-N, and then to have the processed data transmitted back to the entity's place of operation and/or the data center for storage. Thus, the user may use a user device (e.g., a computing device, such as a laptop, desktop, tablet, etc. or any electronic device 211) to instruct a server 1110 storing data to transmit the data to a node 110A-N. In response, the server 1110 may transmit the data (e.g., as one or more data packets) to the cross-domain guard device 1122 present in the entity's place of operation and/or the data center. The cross-domain guard device 1122 can analyze the data packet(s) to determine whether the content in the data packets can be transmitted to a node 110A-N (e.g., by processing the content using one or more rules, taking into account the security domain level of the internal network of the entity's place of operation and/or the data center at which the data is initially stored and the security domain level of the node 110A-N).

If the cross-domain guard device 1122 allows the data packet(s) to pass, the source network gateway 1124 receives the data packet(s). The source network gateway 1124 can then split the data packet(s) into one or more sub-packets, and transmit each sub-packet to the destination network gateway 1134 in the node 110A-N over a different network path via the public network 210 and/or the cellular network 220.

The destination network gateway 1134 can reassemble the sub-packets to form a reassembled version of the original data packet(s). Once reassembled, the destination network gateway 1134 can forward the reassembled version of the original data packet(s) to, for example, the processing servers 206 such that the data can be processed. Optionally, the destination network gateway can forward the reassembled version of the original data packet(s) to a destination cross-domain guard device 1132, and the cross-domain guard device 1132 can inspect the content of the data packet(s) to ensure that such data can pass through to other components in the node 110A-N, such as the processing servers 206. The destination cross-domain guard device 1132 can then forward the reassembled version of the original data packet(s) to the processing servers 206 if the data is allowed to pass. The processing servers 206 can then transmit the processed data back to the destination network gateway (e.g., as one or more data packets with processed data), and the process described above can be repeated in reverse.

Figure 11C:
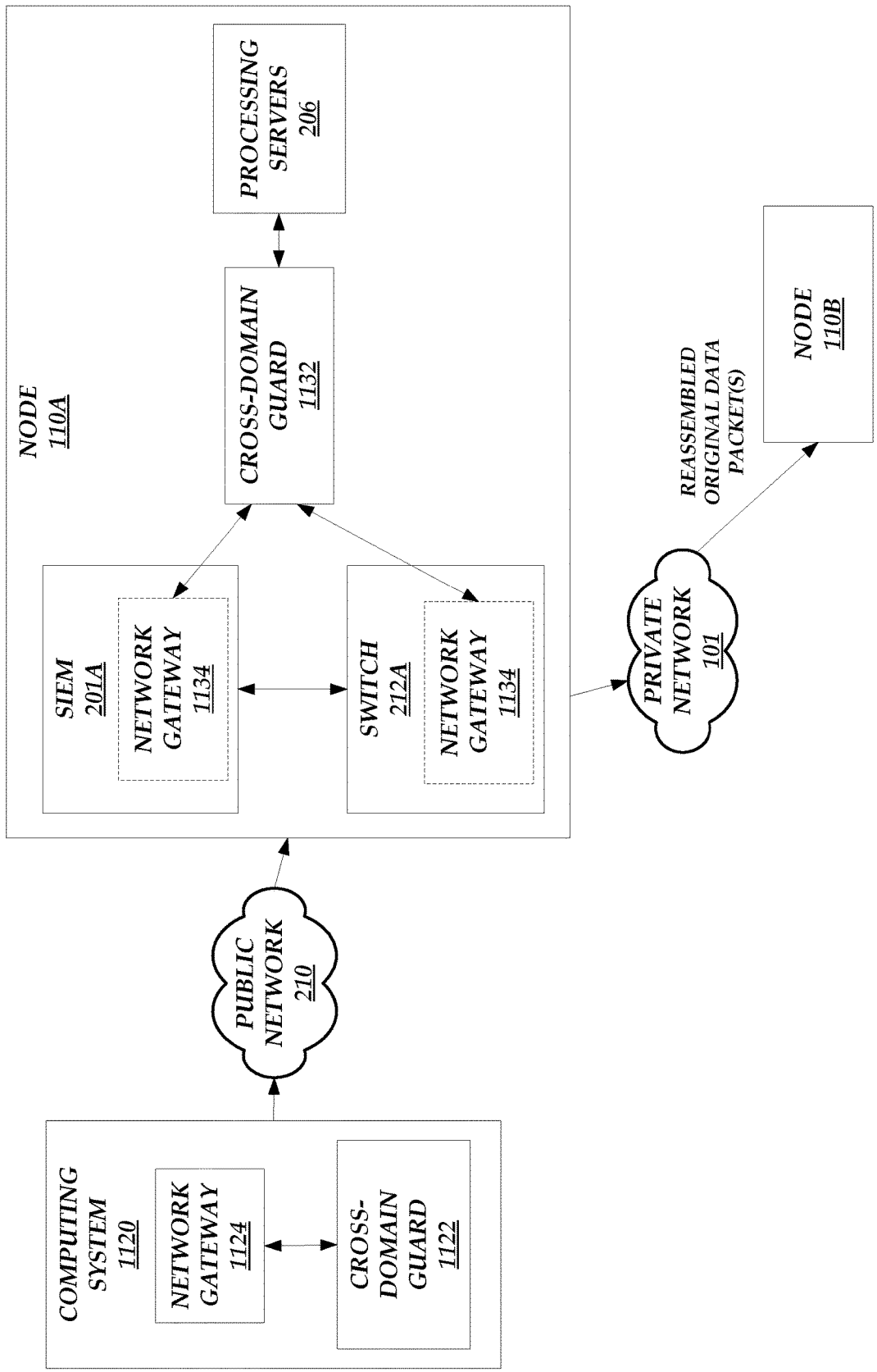

In some embodiments, as illustrated in FIG. 11C, one node 110A-N may be redundant of another node 110A-N (e.g., to ensure data is backed up). Thus, a first node 110A-N (e.g., node 110A) may forward the reassembled version of the original data packet(s) to the redundant node 110A-N (e.g., node 110B). To perform this action, the first node 110A-N can transmit the reassembled version of the original data packet(s) to the redundant node 110A-N via the private network 101 (e.g., not over the public network 210 and/or the cellular network 220, which could compromise the data packet(s)).

Figure 11D:
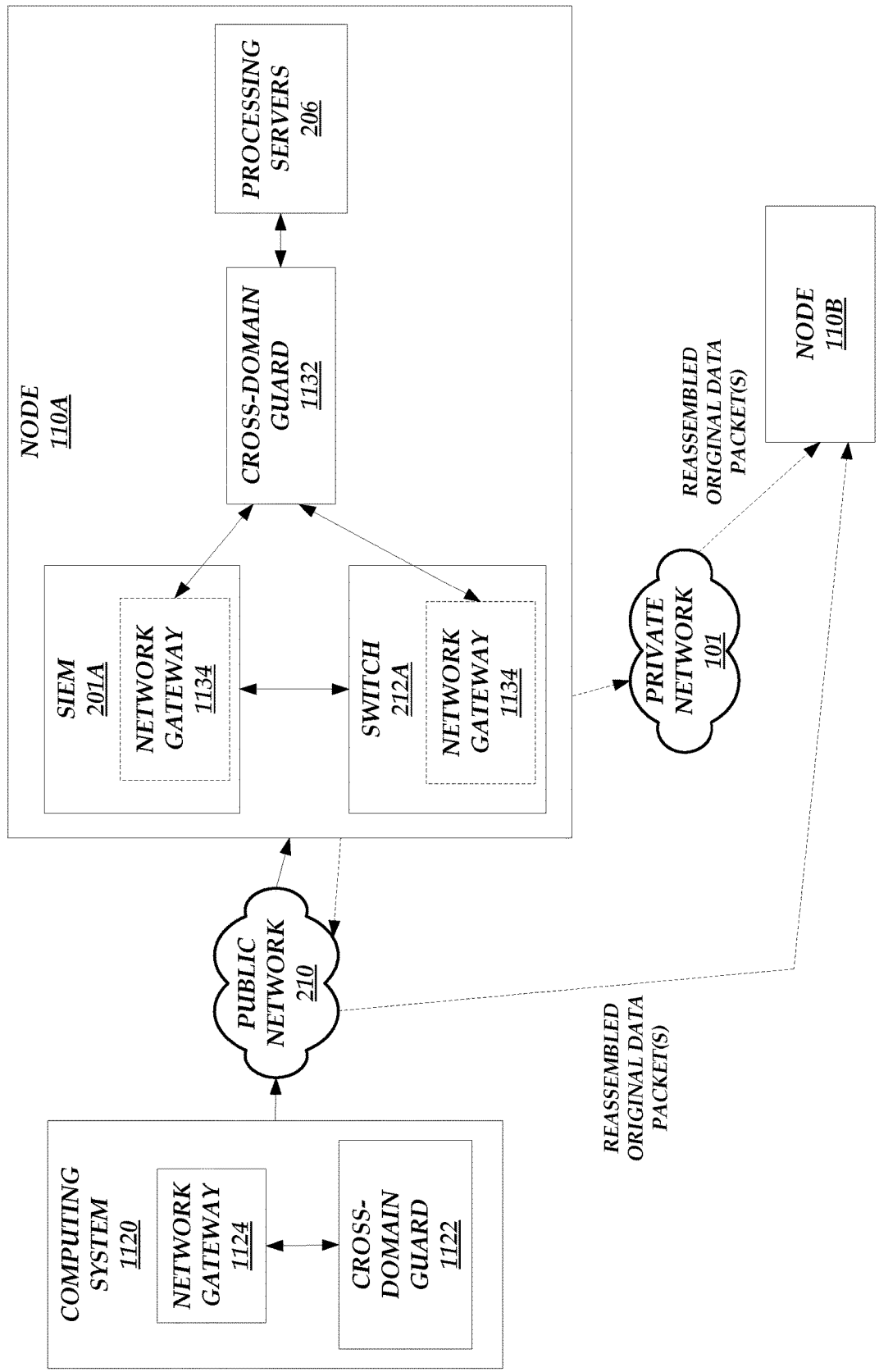

Alternatively or in addition, as illustrated in FIG. 11D, the first node 110A-N can transmit the reassembled version of the original data packet(s) to the redundant node 110A-N via the network gateway 1134 and via the private network 101 or the public network 210/cellular network 220. For example, the network gateway 1134 of the first node 110A-N can split the data packet(s) into one or more sub-packets and transmit each sub-packet over a different network path to the redundant node 110A-N.

Figure 11E:
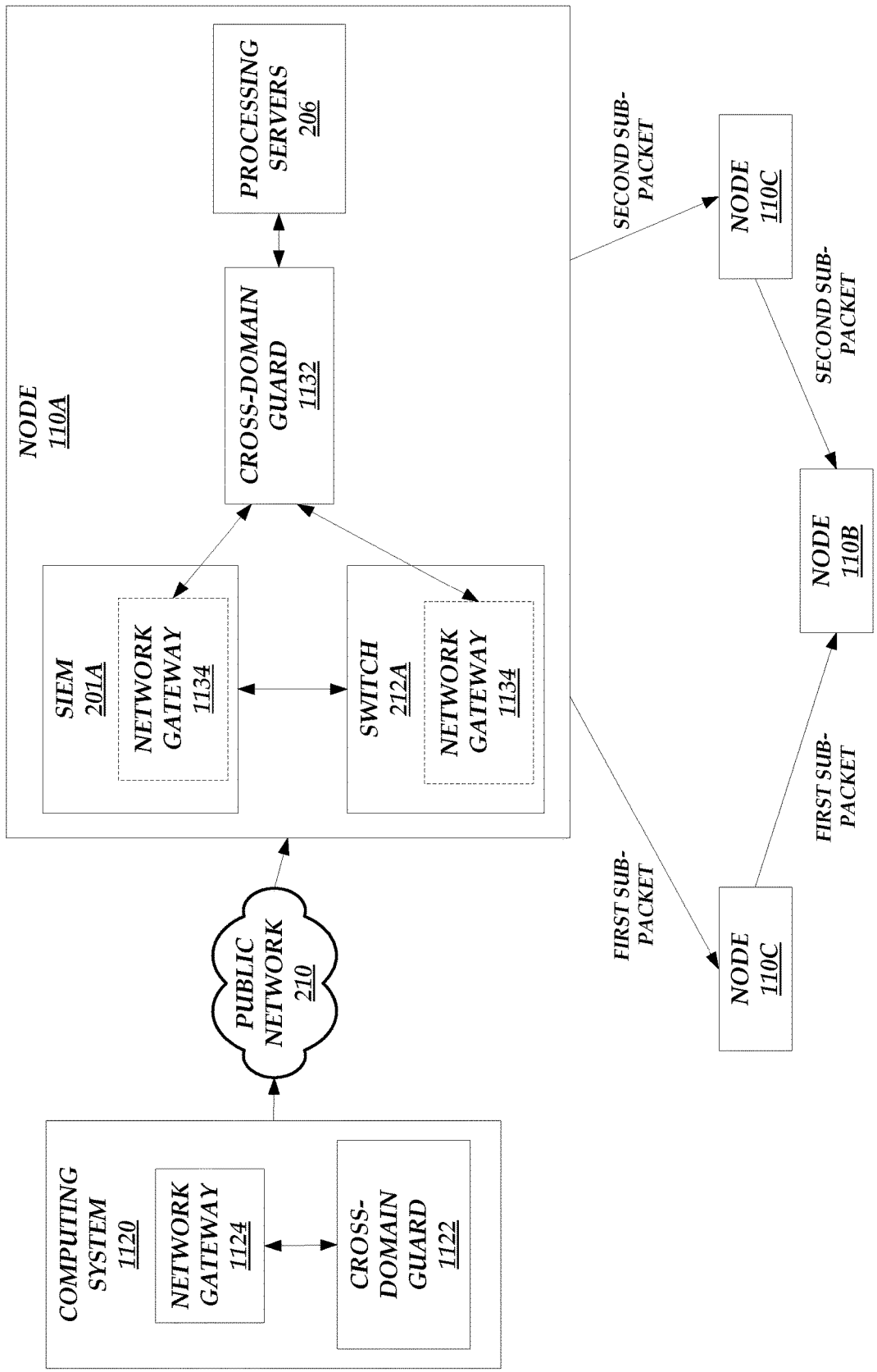

If using the private network 101, each network path may actually pass through another node 110A-N, where the network gateway 1134 of the other node 110A-N acts as a "deflect." As an example illustrated in FIG. 11E, if the first node 110A-N is node 110A and the redundant node is node 110B, the network gateway 1134 of node 110A may transmit a first sub-packet to the node 110B through the private network 101 and via the network gateway of node 110C. The network gateway 1134 of node 110A may also transmit a second sub-packet to the node 110B through the private network 101 and via the network gateway of node 110D. Thus, the communications between nodes 110A-N are more secure because (1) the transmissions occur over the private network 101, which is not accessible via the public network 210 and/or the cellular network 220; (2) the nodes 110A-N are known entities and fully controllable by the node 110A-N operator; and (3) different portions of data packet(s) are transmitted to different nodes 110A-N before reaching the destination node 110A-N such that even if one node 110A-N is compromised, all of the transmitted data is not necessarily compromised.

Using node 110A-N network gateways as "deflects" can also be extended to situations in which data is being communicated between an on-premise location and a node 110A-N. In an advanced use case, a user may wish to transmit data from the entity's place of operation and/or the data center to node 110A so that the data can be processed by node 110A, and then to have the processed data transmitted back to the entity's place of operation and/or the data center for storage. Thus, the user may use a user device (e.g., a computing device, such as a laptop, desktop, tablet, etc. or any electronic device 211) to instruct a server 1110 storing data to transmit the data to node 110A. In response, the server 1110 may transmit the data (e.g., as one or more data packets) to the cross-domain guard device 1122 present in the entity's place of operation and/or the data center. The cross-domain guard device 1122 can analyze the data packet(s) to determine whether the content in the data packets can be transmitted to node 110A (e.g., by processing the content using one or more rules, taking into account the security domain level of the internal network of the entity's place of operation and/or the data center at which the data is initially stored and the security domain level of the node 110A).

If the cross-domain guard device 1122 allows the data packet(s) to pass, the source network gateway 1124 receives the data packet(s). The source network gateway 1124 can then split the data packet(s) into one or more sub-packets. The node 110A, however, may not be the closest node 110A-N to the entity's place of operation and/or the data center. Rather, node 110B may be at a geographic location that is closer to the entity's place of operation and/or the data center than the node 110A. Transmitting data to the node 110B rather than the node 110A may be beneficial because it can reduce the number of devices in the network paths between the on-premise location and the nodes 110A-N that can potentially maliciously capture the data, and because the data transfer rate might be faster when transmitting to the node 110B than to the node 110A. In fact, transmitting data from the on-premise location to the node 110B, and then from the node 110B to the node 110A may be faster than transmitting data from the on-premise location to the node 110B because the private network 101 may be optimized to transfer data at a faster rate than is possible via the public network 210 and/or the cellular network 220. Thus, the source network gateway 1124 may transmit each sub-packet to the node 110B network gateway 1134 over a different network path via the public network 210 and/or the cellular network 220.

The node 110B network gateway 1134 can reassemble the sub-packets to form a reassembled version of the original data packet(s). Once reassembled, the node 110B network gateway 1134 can split the reassembled data packet(s) into sub-packets, and transmit each sub-packet to the node 110A through the private network 101 via different network paths. In particular, the other nodes 110C-N can act as "deflects" such that one network path may pass through the node 110C network gateway, another network path may pass through the node 110D network gateway, and so on. Once all sub-packets are received, the node 110A network gateway 1134 can reassembled the sub-packets into the original data packet(s), and can forward the reassembled original data packet(s) to the processing servers 206 of the node 110A (optionally via the cross-domain guard device 1132 of the node 110A). The processing servers 206 can then process the data and transmit the processed data back to the node 110A network gateway 1134 (e.g., as one or more data packets with processed data). The node 110A network gateway 1134 can then transmit split portions of the data packet(s) to the node 110B network gateway 1134 via different network paths through the private network 101. The node 110B network gateway 1134 can then reassemble the sub-packets into the original data packet(s), split the original data packet(s) into sub-packets, and transmit each sub-packet to the on-premise location via a different network path through the public network 210 and/or the cellular network 220. In some embodiments, the node 110B does not reassemble the sub-packets into the original data packet(s). Rather, the node 110B simply transmits each received sub-packet to the on-premise location via a different network path through the public network 210 and/or the cellular network 220.

Figure 12:
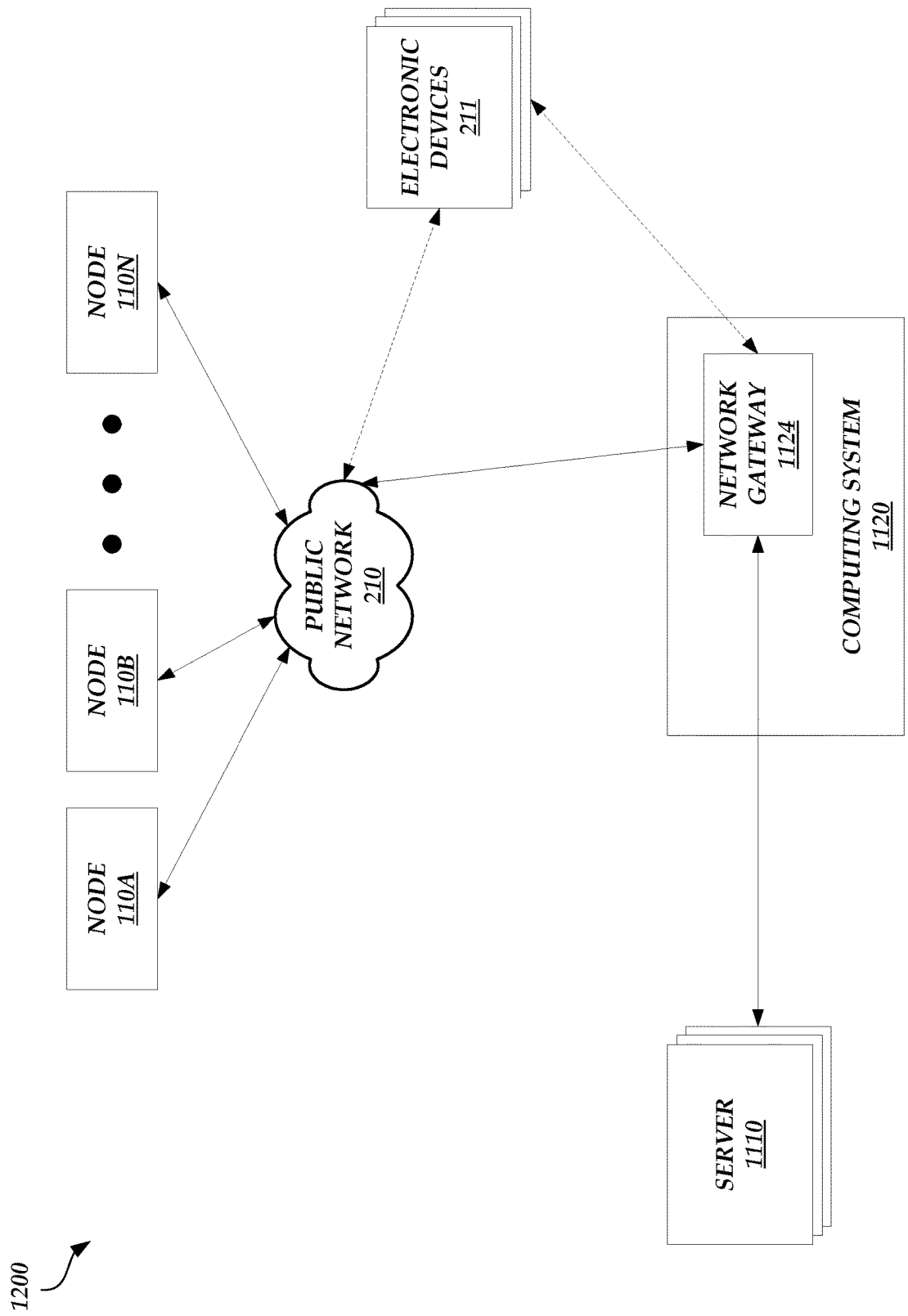
FIG. 12 is a block diagram of a second "on-premise to cloud" environment in which data managed by an entity (e.g., an individual, a company, a business, etc.) and stored locally at the entity's place of operation (e.g., in one or more servers located at the place of operation) and/or stored at a location accessible by the entity (e.g., in one or more servers at a data center) can be securely transmitted to a node of FIG. 1 via the public network, the cellular network, and/or the private network.

FIG. 12 is a block diagram of a second "on-premise to cloud" environment 1200 in which data managed by an entity (e.g., an individual, a company, a business, etc.) and stored locally at the entity's place of operation (e.g., in one or more servers 1110 located at the place of operation) and/or stored at a location accessible by the entity (e.g., in one or more servers 1110 at a data center) can be securely transmitted to a node 110A-N via the public network 210, the cellular network 220, and/or the private network 101. The second "on-premise to cloud" environment 1200 is similar to the first "on-premise to cloud" environment 1100 described with respect to FIGS. 11A-11E, except that a cross-domain guard device 1122 is not present at the on-premise location nor at the nodes 110A-N and the operations described with respect to the cross-domain guard device 1122 are skipped. Thus, the server(s) 1110 may provide data directly to and/or receive data directly from the network gateway 1124, and the network gateways 1134 in the nodes 110A-N may provide data directly to and/or receive data directly from the processing server(s) 206 and/or other servers present in the nodes 110A-N.

Figure 13:
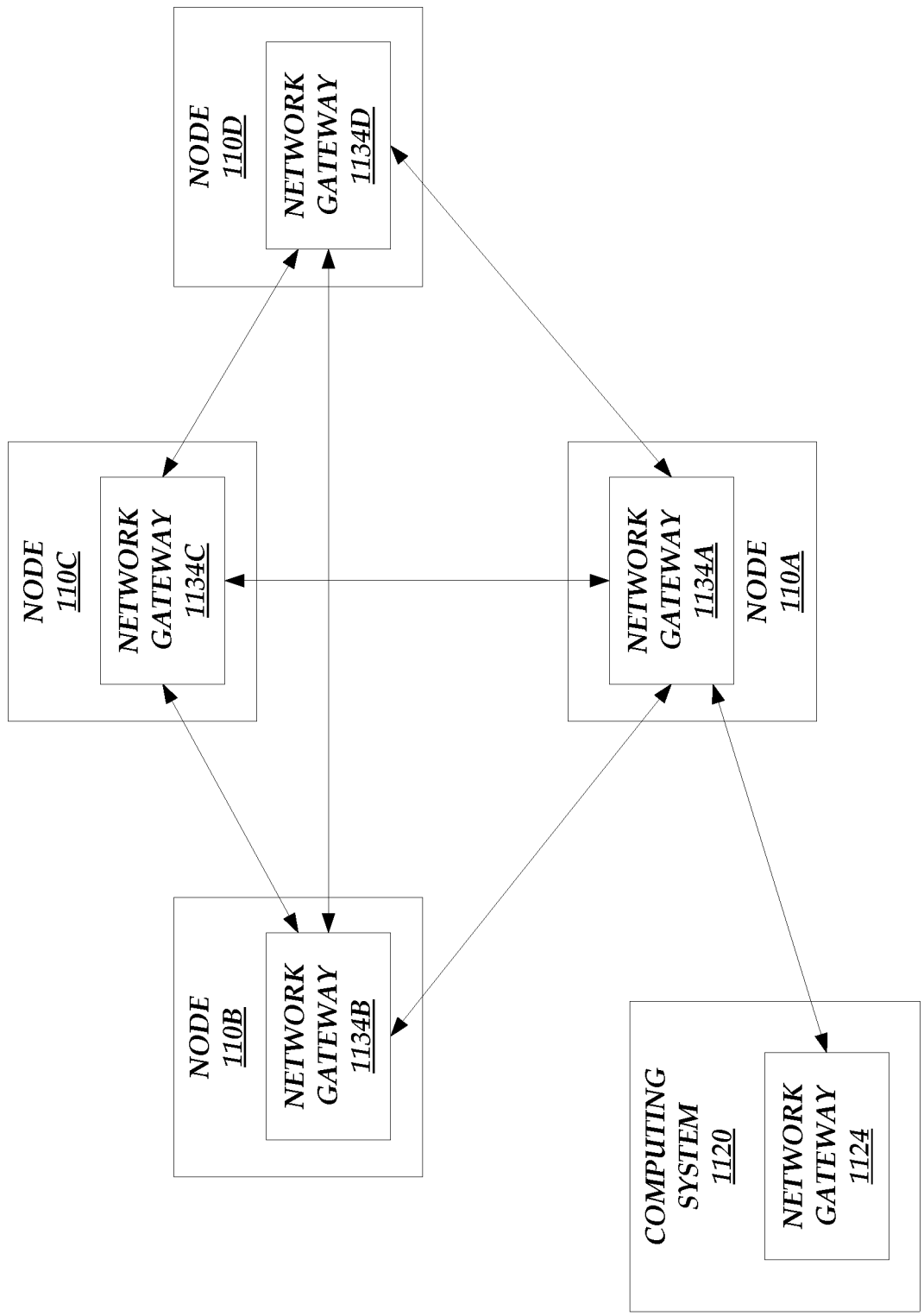
FIG. 13 illustrates a diagram detailing the nodes of FIG. 1 each having a network gateway (e.g., DVN) that allows each node of FIG. 1 to operate as a "deflect," if necessary.

FIG. 13 illustrates a diagram detailing the nodes 110A-D each having a network gateway 1134A-D (e.g., DVN) that allows each node 110A-D to operate as a "deflect," if necessary. For example, the network gateway 1134A of node 110A can receive disassembled original data packet(s) from the network gateway 1124 on-premise. The network gateway 1134A can reassemble the original data packet(s) and transmit the reassembled original data packet(s) to node 110C (or node 110B or node 110D) via nodes 110B and/or 110D (or node(s) 110C-D or node(s) 110B-C).

Figure 14:
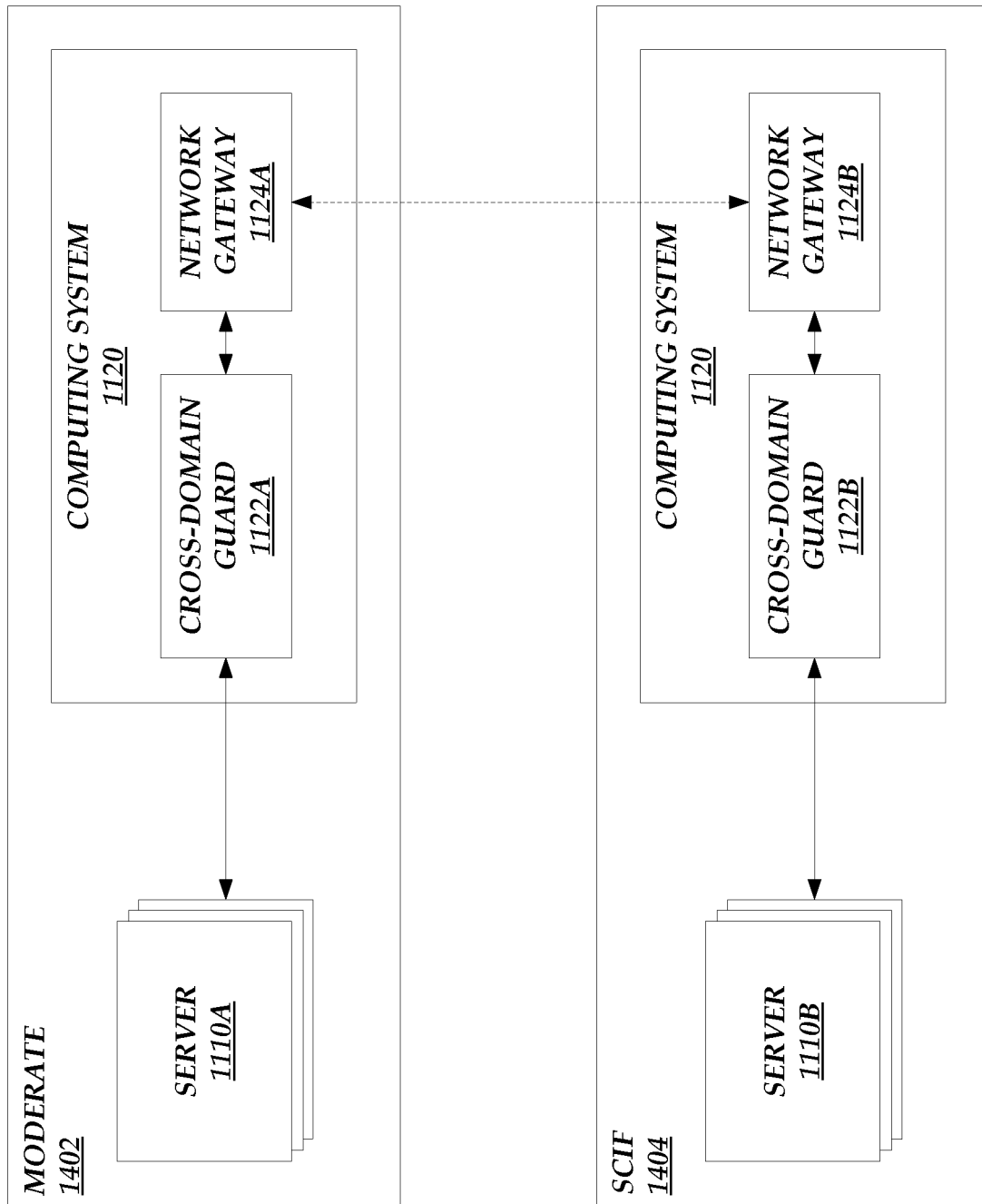
FIG. 14 illustrates a diagram detailing two systems having different security domain levels (where the system identified as "SCIF" has the higher security domain level and the system 1402 identified as "Moderate" has the lower security domain level), with cross-domain guard devices present to control the flow of data between the different security domain levels.

FIG. 14 illustrates a diagram detailing two systems 1402 and 1404 having different security domain levels (where the system 1404 identified as "SCIF" has the higher security domain level and the system 1402 identified as "Moderate" has the lower security domain level), with cross-domain guard devices 1124A-B present to control the flow of data between the different security domain levels. For example, the cross-domain guard device 1124B may prevent certain data from being transmitted from the system 1404 to the system 1402 given that the system 1404 has the higher security domain level.

Figure 15:
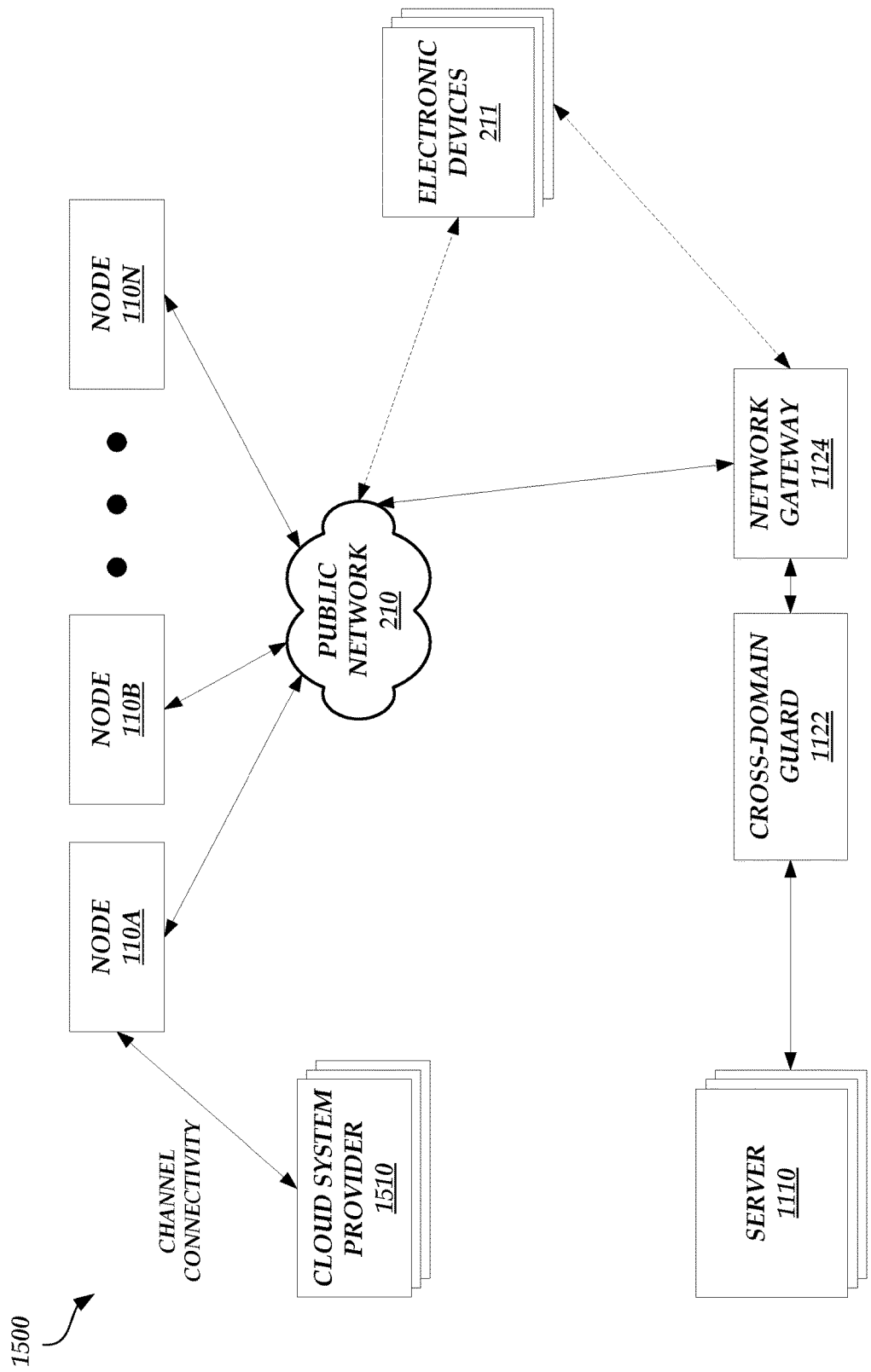
FIG. 15 illustrates a block diagram detailing an embodiment in which data can be communicated between a node of FIG. 1 and a third-party cloud system provider via a direct network backbone connection (e.g., via channel connectivity (ON-Net)) instead of via the public network and/or the cellular network.

FIG. 15 illustrates a block diagram detailing an embodiment in which data can be communicated between a node 110A-N and a third-party cloud system provider 1510 via a direct network backbone connection (e.g., via channel connectivity (ON-Net)) instead of via the public network 210 and/or the cellular network 220. This functionality is referred to as "cloud-to-cloud." For example, data can be communicated between a node 110A-N and a cloud system provider 1510 via the network gateway 1134 of the node 110A-N.

Thus, each node 110A-N can include a network gateway 1134 (e.g., DVN) that allows the respective node 110A-N to operate as a "deflect." In addition, each node 110A-N can have a direct network backbone connection to a third party cloud system provider 1510.

Figure 16:
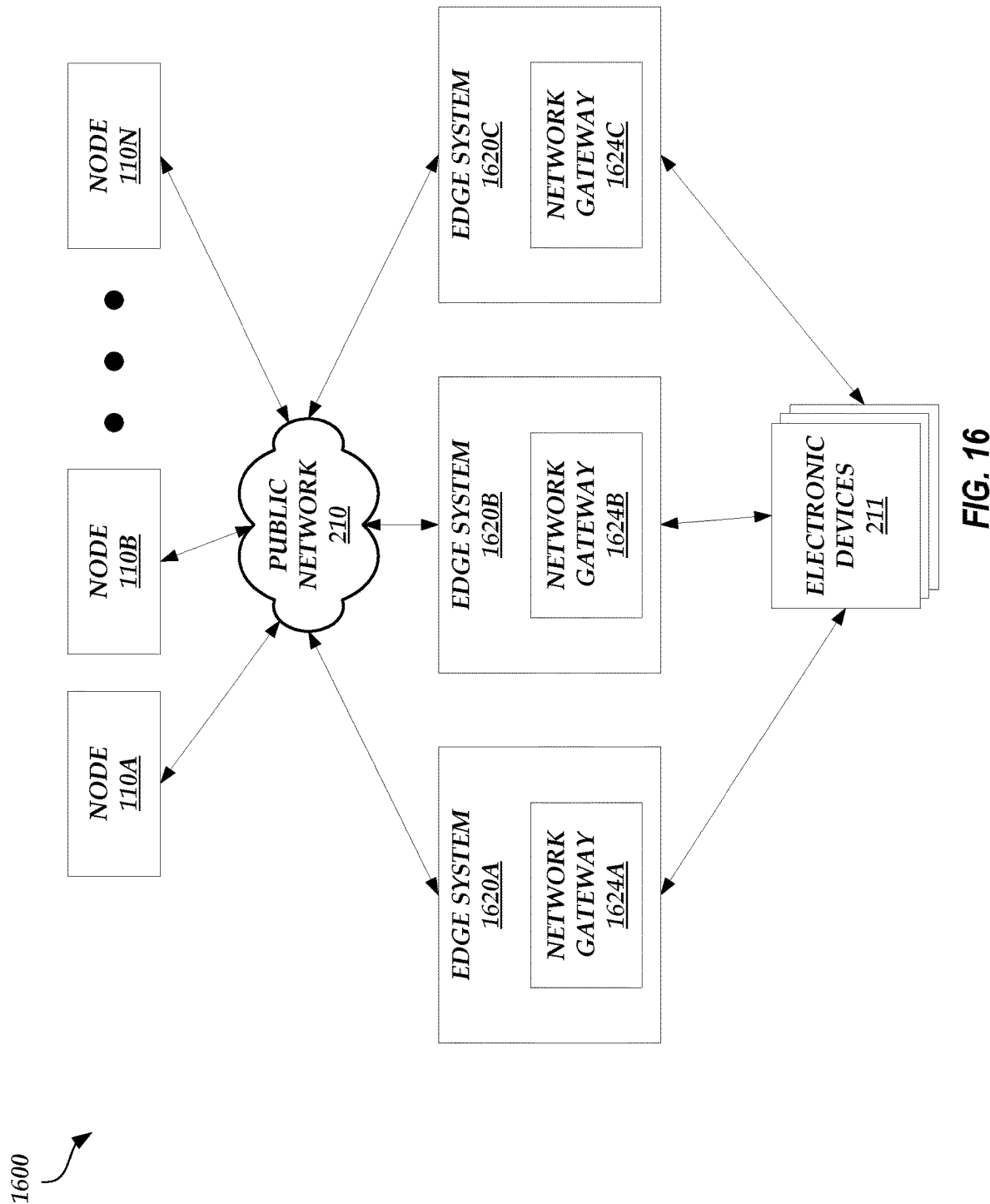
FIG. 16 is a block diagram of another "on-premise to cloud" environment in which data managed by an electronic device can be securely transmitted through an edge system to a node of FIG. 1 via the public network, the cellular network, and/or the private network.

FIG. 16 is a block diagram of another "on-premise to cloud" environment 1600 in which data managed by an electronic device 211 can be securely transmitted through an edge system 1620 to a node 110A-N via the public network 210, the cellular network 220, and/or the private network 101. For example, an edge system 1620 may include a network gateway 1624 and may be associated with a particular geographic region. An electronic device 211 may transmit data to the the edge system 1620 located nearest to the electronic device 211 (e.g., the edge system 1620 located in the same or similar geographic region as the electronic device 211) via the public network 210 and/or the cellular network 220.

An edge system 1620 may include hardware (e.g., one or more processors, memory, input/output interfaces, a network gateway, etc.) that allow the edge system 1620 to perform data processing. Such processing can include processing electronic device 211 data, transmitting electronic device 211 data to another entity, processing data received from a node 110A-N, transmitting data received from a node 110A-N to an electronic device 211 (e.g., policies to implement), etc.

The network gateway 1624 of an edge system 1620 may be a source network gateway, such as a source network gateway 1124 described above. The edge system 1620 (e.g., the source network gateway 1624) can establish a secure connection with a destination network gateway 1134 (e.g., a network gateway 1134 operating in a node 110A-N) in a manner as described above to transmit the electronic device 211 data securely to a node 110A-N.

Once the electronic device 211 data is received by a node 110A-N, the data can be routed to another node 110A-N in a manner as described herein. Thus, an electronic device 211 can transmit data to an edge system 1620 nearest to the electronic device 211, and the data can then be routed securely to any node 110A-N, including a node 110A-N that is associated with a geographic region that is different than a geographic region with which the electronic device 211 is associated.

Figure 17:
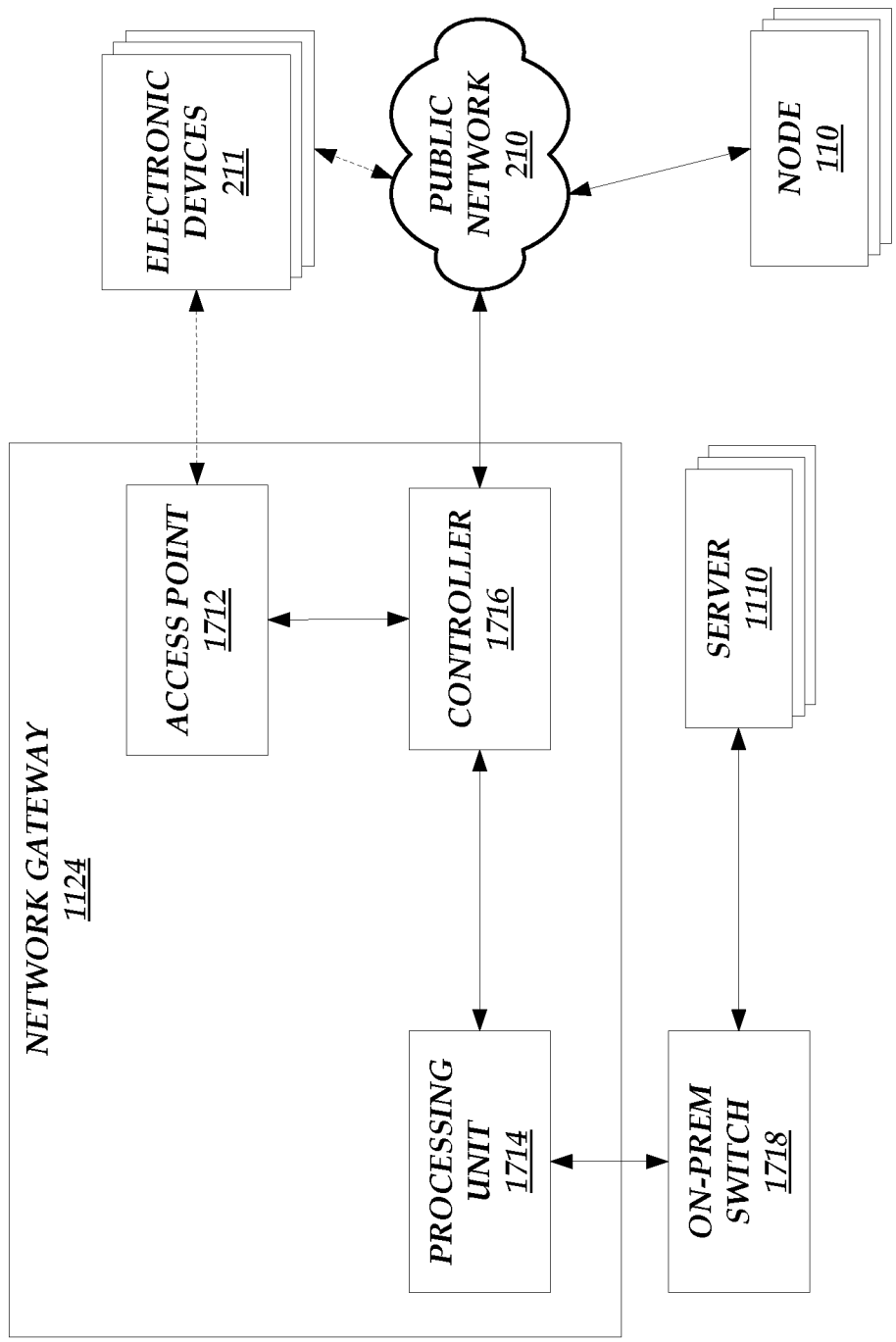
FIG. 17 is a block diagram of a network gateway, according to one embodiment.

FIG. 17 is a block diagram of a network gateway 1124, according to one embodiment. As illustrated in FIG. 17, the network gateway includes an access point 1712, a processing unit 1714, and a controller 1716.

The access point 1712 can be a wired or wireless access point 1712 that allows user devices, such as electronic devices 211, to connect to the network gateway 1124. The access point 1712 can perform an authentication operation before allowing a user device to access an on-premise network, the nodes 110A-N, and/or remote applications (e.g., cloud applications) associated with the entity operating the on-premise network. For example, the access point 1712 can store a list of media access control (MAC) addresses. When a user device attempts to connect to the access point 1712, the access point 1712 can request the user device's MAC address and compare the user device's MAC address to the stored MAC address list. If the user device's MAC address is present on the stored MAC address list, the access point 1712 may successfully authenticate the user device and allow the user device to access the on-premise network, the nodes 110A-N, and/or the remote applications.

The access point 1712 can alternatively or in addition perform other authentication operations to determine whether the user device should be granted access to the on-premise network, the nodes 110A-N, and/or the remote applications. For example, the access point 1712 can perform heuristics to determine whether a user device should be authenticated even if the MAC address of the user device is present on the stored MAC address list. For example, if a user device attempts to access the network gateway 1124 from a first location, and then a few minutes later attempts to access the network gateway 1124 from a second location that could not be reached from the first location within a few minutes, this may indicate that some malicious activity is taking place, and the access point 1712 can deny the access request.

If a user device is granted access to the network gateway 1124 via the access point 1712, the user device can access the server(s) 1110 via the controller 1716, the processing unit 1714, and an on-premise switch 1718 present external to the network gateway 1124. The user device can also access a node 110 or a remote application via the controller 1716 and the public network 210.

Alternatively or in addition, a user device can gain access the network gateway 1124 via the public network 210. For example, the user device can attempt to access a network address (e.g., an Internet protocol (IP) address) corresponding to the network gateway 1124. The controller 1716 may receive the access request and redirect the user device to the access point 1712. The access point 1712 may then perform the authentication described herein. If the user device can be authenticated, the access point 1712 can inform the controller 1716 that access is granted, and the controller 1716 can allow the user device to access the on-premise network, a node 110A-N, and/or a remote application.

The processing unit 1714 can include one or more central processing units (CPUs), one or more graphical processing units (GPUs), memory, hardware adapters, and/or other hardware components. In a "standard" implementation, the processing unit 1714 can provide security services, such as encryption services, so that data can be securely transmitted over the public network 210. For example, data received from a server 1110 via the on-premise switch 1118 or from a user device can be encrypted by the processing unit 1714. Once encrypted, the processing unit 1714 can transmit the encrypted data to a remote application, a node 110A-N, or another computing device via the controller 1716 and the public network 210.

In a "cloud-ready" implementation, the processing unit 1714 can run remote applications (e.g., cloud applications) locally. For example, in this implantation, the processing unit 1714 may include additional CPUs, memory, etc. so that the remote applications can be run successfully locally. Thus, a user device may not need to access a remote application via a public network 210 in order to obtain a desired service, to process data, and/or the like. Rather, the user device can obtain the benefits of a remote application without having to transfer data over the public network 210 (in embodiments in which the user device accesses the network gateway 1124 directly via the access point 1712). In other words, the processing unit 1714 can implement a cloud environment such that a user device can access the cloud environment on-premise. In some embodiments, the processing unit 1714 can serve as a backup for remote applications accessible via the public network 210, or the remote applications accessible via the public network 210 can serve as a backup for the processing unit 1714. Thus, similar data may be stored on the processing unit 1714 and in remote servers running the remote applications.

In a "media and analytics" implementation, the processing unit 1714 can process data received from the server(s) 1110, the node(s) 110A-N, the remote application(s), and/or a user device. Because the amount of data to process may be large, the processing unit 1714 may include one or more GPUs, which may be used to perform the data processing instead of or in addition to the CPU(s).

In both the "cloud-ready" implementation and the "media and analytics" implementations, the processing unit 1714 can provide the security services described herein.

In some embodiments, the processing unit 1714 can operate in a non-cooling environment. Thus, the processing unit 1714 may not include cooling components, such as fans, liquid coolers, air coolers, etc.

The controller 1716 may serve as an interface between the network gateway 1124 and the public network 210. In some embodiments, the controller 1716 may be the session controller described above.

As described herein, the network gateway 1124 and the network gateway 1134 may provide similar functionality. Thus, the network gateway 1134 may include similar hardware components as the network gateway 1124.

Figure 18:
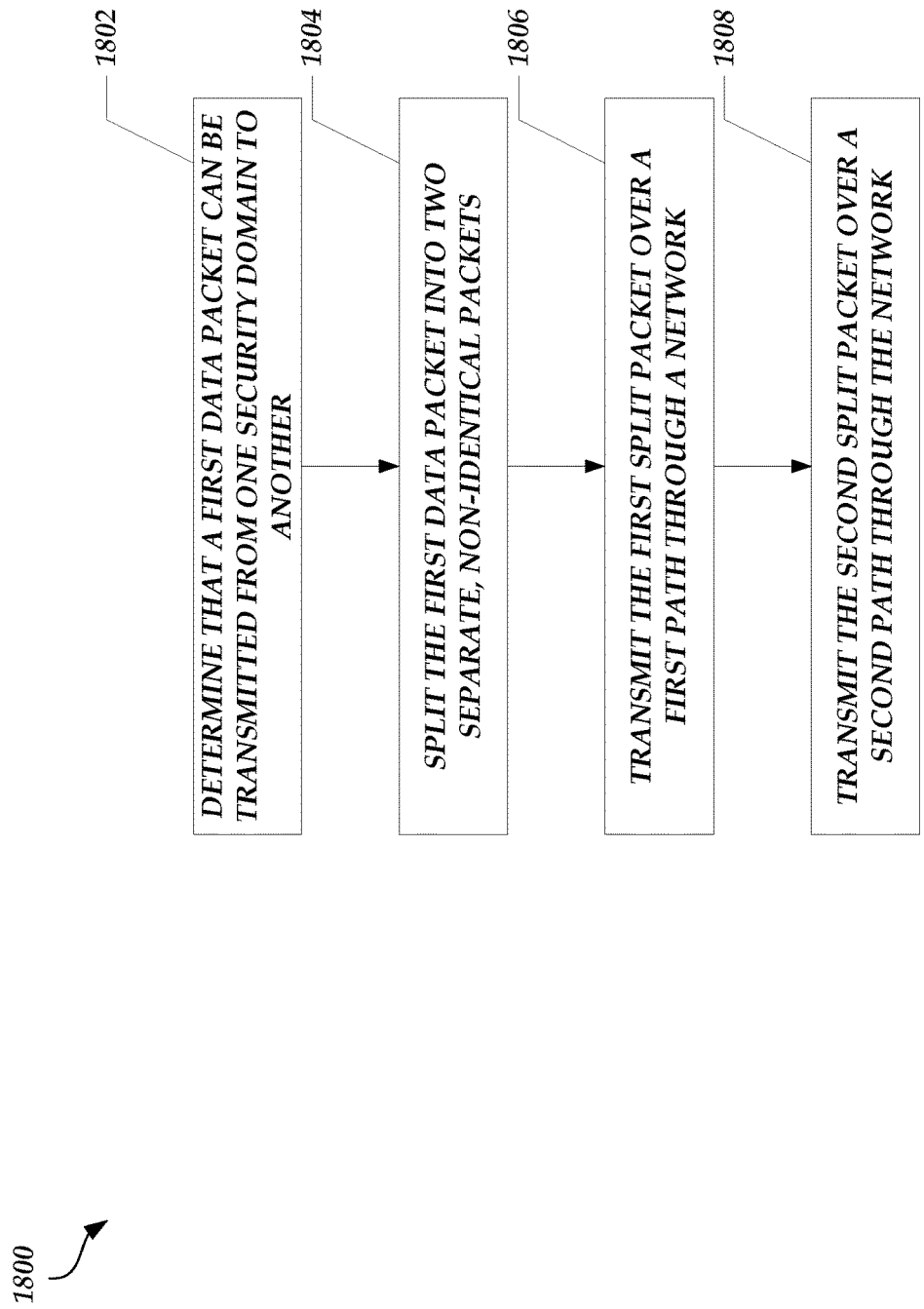
FIG. 18 illustrates a process that may be implemented by a network gateway and/or a cross-domain guard device to transmit data over a public network.

FIG. 18 illustrates a process 1800 that may be implemented by a network gateway 1124 and/or a cross-domain guard device 1122 to transmit data over a public network. The process 1800 begins at block 1802.

At block 1802, a determination is made that a first data packet can be transmitted from one security domain to another. For example, the first data packet may be present in a first security domain, and the determination may be made that the first data packet can be transmitted to a second security domain based on an analysis of a content of the first data packet.

At block 1804, the first data packet is split into two separate, non-identical packets. In further embodiments, the first data packet can be split into 3, 4, 5, etc. separate, non-identical packets.

At block 1806, the first split packet is transmitted over a first path through a network. The first split packet can be transmitted over the first path to another network gateway.

At block 1808, the second split packet is transmitted over a second path different than the first path through the network. The second split packet can be transmitted over the second path to the same network gateway as the first split packet. The other network gateway can then create a reassembled version of the first data packet using the first and second split packets.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for securely communicating data, the system comprising:
    a computing system comprising one or more computing devices, the computing system configured to operate as a cross-domain guard, the computing system located in a data center that has an internal network with a first security domain, the computing system configured with computer-executable instructions that, when executed, cause the computing system to:
        determine that a first data packet can be transmitted from the first security domain to a second security domain based on an analysis of content of the first data packet; and
        prevent transmission of a second data packet from the first security domain to the second security domain based on an analysis of content of the second data packet;
    a source network gateway in communication with the computing system and located in the data center, the source network gateway comprising a hardware processor, the source network gateway configured with second computer-executable instructions that, when executed, cause the source network gateway to obtain and split the first data packet into a third data packet and a fourth data packet that is not a duplicate of the third data packet; and
    a remote system located at a location remote from the data center, the remote system having a second internal network with the second security domain, the remote system further comprising a remote network gateway,
    wherein the remote network gateway is configured with third computer-executable instructions that, when executed, cause the remote network gateway to:
        obtain the third data packet from the source network gateway via a first path through the network;
        obtain the fourth data packet from the source network gateway via a second path through the network; and
        assemble the third data packet and the fourth data packet to form a reassembled version of the first data packet.

2. The system of claim 1, further comprising a redundant remote system in communication with the remote system via a private network, the redundant remote system configured to obtain the reassembled version of the first data packet from the remote system via the private network.

3. The system of claim 1, further comprising a second remote system in communication with the remote system via a private network, wherein the second remote system has a third internal network with the second security domain, the second remote system further comprising a second remote network gateway and a processing server,
    wherein the second remote network gateway is configured with fourth computer-executable instructions that, when executed, cause the second remote network gateway to:
        obtain a fifth data packet from the remote network gateway via a third path through the private network, the fifth data packet created based on a split of the reassembled version of the first data packet;
        obtain a sixth data packet from the remote network gateway via a fourth path through the private network, the sixth data packet created based on the split of the reassembled version of the first data packet;
        assemble the fifth data packet and the sixth data packet to form a second reassembled version of the first data packet; and
        transmit the second reassembled version of the first data packet to the processing server.

4. The system of claim 3, wherein the fourth computer-executable instructions, when executed, further cause the second remote network gateway to:
    obtain a processed data packet from the processing server;
    split the processed data packet into a seventh data packet and an eighth data packet;
    transmit the seventh data packet to the remote network gateway via a fifth path through the private network; and
    transmit the eighth data packet to the remote network gateway via a sixth path through the private network such that the remote network gateway can assemble the seventh and eighth data packets into a ninth data packet and forward contents of the ninth data packet to the source network gateway.

5. The system of claim 3, wherein the third path passes through a network gateway of a third remote system in communication with the remote system and the second remote system via the private network, and wherein the fourth path passes through a network gateway of a fourth remote system in communication with the remote system and the second remote system via the private network.

6. The system of claim 1, wherein the remote system comprises a processing server, and wherein the processing server receives the reassembled version of the first data packet from the remote network gateway.

7. The system of claim 1, wherein the source network gateway comprises an access point, a controller, and a processing unit.

8. The system of claim 7, wherein the access point is configured to authenticate a user device using at least one of heuristics or a media access control (MAC) address of the user device.

9. The system of claim 7, wherein the processing unit comprises at least one graphical processing unit (GPU), and wherein the processing unit is configured to process the content included in the first data packet using the at least one GPU.

10. The system of claim 7, wherein the processing unit is configured to run remote applications locally in the data center such that a user device can access the remote applications via the access point without communicating data over a public network.

11. The system of claim 7, wherein the processing unit is coupled to a switch in the data center, wherein the controller is coupled to the processing unit and the access point, and wherein the controller serves as an interface to a public network.

12. A computer-implemented method for securely communicating data, the computer-implemented method comprising:
 determining that a first data packet present in a first security domain in a data center can be transmitted from the first security domain to a second security domain based on an analysis of content of the first data packet;
 preventing transmission of a second data packet from the first security domain to the second security domain based on an analysis of content of the second data packet;
 splitting the first data packet into a third data packet and a fourth data packet that is not a duplicate of the third data packet;
 transmitting the third data packet via a source network gateway and a first path through a network to a second network gateway remote from the data center; and
 transmitting the fourth data packet via the source network gateway and a second path through the network to the second network gateway,
 wherein the second network gateway is configured to assembly the third data packet and the fourth data packet to form a reassembled version of the first data packet.

13. The computer-implemented method of claim 12, wherein a redundant network gateway is in communication with the second network gateway via a private network, the redundant network gateway configured to obtain the reassembled version of the first data packet from the second network gateway via the private network.

14. The computer-implemented method of claim 12, further comprising, by a third network gateway in communication with the second network gateway via a private network:
 obtaining a fifth data packet from the second network gateway via a third path through the private network, the fifth data packet created based on a split of the reassembled version of the first data packet;
 obtaining a sixth data packet from the second network gateway via a fourth path through the private network, the sixth data packet created based on the split of the reassembled version of the first data packet;
 assembling the fifth data packet and the sixth data packet to form a second reassembled version of the first data packet; and
 transmitting the second reassembled version of the first data packet to a processing server.

15. The computer-implemented method of claim 14, further comprising, by the third network gateway:
 obtaining a processed data packet from the processing server;
 splitting the processed data packet into a seventh data packet and an eighth data packet;
 transmitting the seventh data packet to the second network gateway via a fifth path through the private network; and
 transmitting the eighth data packet to the second network gateway via a sixth path through the private network such that the second network gateway can assemble the seventh and eighth data packets into a ninth data packet and forward contents of the ninth data packet to the source network gateway.

16. The computer-implemented method of claim 14, wherein the third path passes through a fourth network gateway in communication with the second and third network gateways via the private network, and wherein the fourth path passes through a fifth network gateway in communication with the second and third network gateways via the private network.

17. The computer-implemented method of claim 12, wherein the source network gateway comprises an access point, a controller, and a processing unit.

18. The computer-implemented method of claim 17, wherein the processing unit comprises at least one graphical processing unit (GPU), and wherein the processing unit is configured to process the content included in the first data packet using the at least one GPU.

19. The computer-implemented method of claim 17, wherein the processing unit is configured to run remote applications locally in the data center such that a user device can access the remote applications via the access point without communicating data over a public network.

20. Non-transitory, computer-readable storage media comprising computer-executable instructions, wherein the computer-executable instructions, when executed by a computing system in a data center, cause the computing system to:
 determine that a first data packet present in a first security domain can be transmitted from the first security domain to a second security domain based on an analysis of content of the first data packet;
 prevent transmission of a second data packet from the first security domain to the second security domain based on an analysis of content of the second data packet;
 split the first data packet into a third data packet and a fourth data packet that is not a duplicate of the third data packet;
 transmit the third data packet via a source network gateway and a first path through a network to a second network gateway remote from the data center; and
 transmit the fourth data packet via the source network gateway and a second path through the network to the second network gateway,
 wherein the second network gateway is configured to assembly the third data packet and the fourth data packet to form a reassembled version of the first data packet.

* * * * *